(12) United States Patent
Lee et al.

(10) Patent No.: US 9,426,704 B2
(45) Date of Patent: *Aug. 23, 2016

(54) APPARATUS AND METHOD FOR MANAGING AN ACCESS MODE OF A NODE B IN A WIRELESS COMMUNICATION SYSTEM

(71) Applicant: Samsung Electronics Co., Ltd., Gyeonggi-do (KR)

(72) Inventors: Ok-Seon Lee, Gyeonggi-do (KR); Yung-Soo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/673,001

(22) Filed: Mar. 30, 2015

(65) Prior Publication Data

US 2015/0208294 A1 Jul. 23, 2015

Related U.S. Application Data

(63) Continuation of application No. 12/797,271, filed on Jun. 9, 2010.

(30) Foreign Application Priority Data

Jun. 9, 2009 (KR) ........................ 10-2009-0051131

(51) Int. Cl.
H04W 36/00 (2009.01)
H04W 36/22 (2009.01)
(Continued)

(52) U.S. Cl.
CPC ...... *H04W 36/0077* (2013.01); *H04W 36/0061* (2013.01); *H04W 36/22* (2013.01);
(Continued)

(58) Field of Classification Search
CPC ... H04W 48/08; H04W 48/16; H04W 84/045; H04W 36/0061; H04W 36/0077; H04W 88/10; H04W 36/22; H04W 36/30; H04W 60/04
See application file for complete search history.

(56) References Cited

U.S. PATENT DOCUMENTS

2008/0043666 A1 2/2008 Tamura et al.
2009/0092078 A1 4/2009 Czaja et al.
(Continued)

FOREIGN PATENT DOCUMENTS

EP 1 973 365 9/2008
KR 10-2009-0024861 3/2009
(Continued)

OTHER PUBLICATIONS

Korean Office Action dated Sep. 18, 2015 issued in counterpart Appln. No. 10-2009-0051131, 6 pages.
(Continued)

*Primary Examiner* — Jianye Wu
(74) *Attorney, Agent, or Firm* — The Farrell Law Firm, P.C.

(57) ABSTRACT

An apparatus and a method for managing an access mode of an NB in a wireless communication system. The method includes receiving, from a first NB, a request to change the access mode of the second NB from a first mode into a second mode; determining, by the CN, to change the access mode of the second NB into the second mode; transmitting, to the second NB, a request message requesting to change the access mode of the second NB; and receiving, from the second NB, a response message informing of an access mode control result. If the first mode allows access only to terminals having a registration in the second NB, and the second mode allows access to terminals, the second NB further grants access to at least one terminal not registered in the second NB, after changing the access mode.

29 Claims, 19 Drawing Sheets

(51) Int. Cl.
  *H04W 48/16* (2009.01)
  *H04W 36/30* (2009.01)
  *H04W 60/04* (2009.01)
  *H04W 48/08* (2009.01)
  *H04W 84/04* (2009.01)
  *H04W 88/10* (2009.01)

(52) U.S. Cl.
  CPC ............ *H04W 36/30* (2013.01); *H04W 48/16* (2013.01); *H04W 60/04* (2013.01); *H04W 48/08* (2013.01); *H04W 84/045* (2013.01); *H04W 88/10* (2013.01)

(56) References Cited

U.S. PATENT DOCUMENTS

2009/0135796 A1* 5/2009 Nanda et al. ................ 370/338
2010/0197294 A1* 8/2010 Fox et al. ................... 455/422.1

FOREIGN PATENT DOCUMENTS

| WO | WO 2007/086679 | 8/2007 |
|----|----------------|--------|
| WO | WO 2008/096162 | 8/2008 |

OTHER PUBLICATIONS

U.S. Office Action dated Aug. 25, 2015 issued in counterpart U.S. Appl. No. 12/797,271, 12 pages.
U.S. Final Office Action dated Nov. 4, 2015 issued in counterpart U.S. Appl. No. 12/797,271, 13 pages.
U.S. Office Action dated Nov. 4, 2015 issued in counterpart U.S. Appl. No. 12/797,271, 13 pages.
Huawei, "Discussion on Inbound Mobility from 3G Marco Cell to HNB", R3-090802, 3GPP TSG-RAN WG3 Meeting#63bis, Mar. 23-26, 2008.
Huawei, "Discussion of Inbound Handover", R3-090932, 3GPP TSG-RAN WG3#63bis, Mar. 23-26, 2009.
Korean Office Action dated Apr. 10, 2015 issued in counterpart application No. 10-2009-0051131.
Alcatel-Lucent, Vodafone, "Congested H(e)NB Hybrid Access Mode Cell", R3-091053, 3GPP TSG-RAN WG3 Meeting #64, May 4-8, 2009, 4 pages.
ZTE, "Modification of Access Mode of CSG Cell", R3-091207, 3GPP TSG RAN WG3 Meeting #64, May 4-8, 2009, 2 pages.
ETRI, "Access Mode Change of CSG Cell During Operation", R3-091800, 3GPP TSG-RAN WG3 Meeting #65, Aug. 24-28, 2009, 2 pages.
European Search Report dated Jun. 22, 2016 issued in counterpart Appln. No. 10786343.3-1854, 7 pages.

* cited by examiner

APPARATUS AND METHOD FOR MANAGING AN ACCESS MODE OF A NODE B IN A WIRELESS COMMUNICATION SYSTEM

PRIORITY

The present application is a Continuation of U.S. Ser. No. 12/797,271, which was filed in the U.S. Patent and Trademark Office on Jun. 9, 2010, and claims priority under 35 U.S.C. §119(a) to Korean Patent Application Serial No. 10-2009-0051131, which was filed in the Korean Intellectual Property Office on Jun. 9, 2009, the entire disclosure of each of which is hereby incorporated by reference.

BACKGROUND OF THE INVENTION

1. Field of the Invention

The present invention relates generally to an apparatus and a method for managing an access mode of a Node B (NB) in a wireless communication system. More particularly, the present invention relates to an apparatus and a method for determining and changing an access mode of an NB, depending on different factors in a wireless communication system.

2. Description of the Related Art

In a conventional cellular communication system, an NB, which is connected to a mobile communication core network, provides communication services to User Equipments (UEs) that located within a cell area of the NB.

When an amount of communication in a cell area of an NB is expected to increase temporarily, for example, during a large gathering such as a party or concert, a load of the cell is also expected to increase temporarily, which may affect the quality of the communication services provided by the NB. When this occurs, the load of the cell may be distributed by temporarily adding a mobile NB, e.g., an NB mounted on a vehicle, to the area where the amount of communication is expected to be large.

Additionally, in a conventional cellular communication system, a channel state often deteriorates due to a geographical condition inside a cell, an increased distance between a UE and an NB, or movement of a UE. For example, a shadowing area may be formed inside a building, such as an office or a house, which is located inside a coverage area of an NB. If a UE is located in the shadowing area, an NB may not be able perform sufficient communication because a channel state associated with the UE is poor.

In order to improve communication in areas with poor channel conditions, a femto-cell service may be utilized. A femto cell is a small cell area formed by a compact NB that is commonly installed inside an office or a house and that accesses a mobile communication core network via a broadband network. The compact NB is a low power NB, which is often installed by a user, not the service provider and the compact NB may also be referred to as a micro NB, a self configurable NB, an indoor NB, a home NB, or a femto NB. In the following description, the compact NB is referred to as a femto NB.

There are three access modes of a femto NB that are currently under discussion in the current $3^{rd}$ Generation Partnership Project Long Term Evolution (3GPP LTE), which are defined as follows.

1. Open Access Mode: a mode that grants access to all users that are not registered in an NB.

2. Closed Access Mode: a mode that grants access only to users that are registered in an NB.

3. Hybrid Access Mode: a mode that that grants access to a user that is registered in an NB, and also grants an access to users that are not registered in the NB.

The above-defined various access modes of the femto NB may also be applied to a mobile NB and a general macro NB.

Currently, when an NB is installed, e.g., a femto NB, a mobile NB, or a general macro NB, an NB access mode is permanently set. Accordingly, in an environment where neighbor NBs use the same frequency, when a UE that receives a service from an NB that utilizes an open access mode enters a coverage of an NB that utilizes a closed access mode, a serious interference factor is generated between the neighbor NBs that use the different access modes, which deteriorates communication quality.

SUMMARY OF THE INVENTION

The present invention is designed to address at least the above-mentioned problems and/or disadvantages occurring in the prior art and to provide at least the advantages described below. Accordingly, an aspect of the present invention is to provide an apparatus and a method for managing an access mode of an NB in a wireless communication system.

Another aspect of the present invention is to provide an apparatus and a method for solving an interference problem that occurs between neighbor NBs using different access modes, but the same frequency, and providing a load balancing effect in a specific area or when an event occurs by determining and changing an access mode of an NB depending on different factors in a wireless communication system.

In accordance with an aspect of the present invention, a method is provided for changing an access mode of a second node B (NB), by a core network (CN), in a wireless communication system. The method includes receiving, from a first NB, a request to change the access mode of the second NB from a first mode into a second mode; determining, by the CN, to change the access mode of the second NB into the second mode; transmitting, to the second NB, a request message requesting to change the access mode of the second NB; and receiving, from the second NB, a response message informing of an access mode control result. If the first mode allows access only to users or terminals having a registration in the second NB, and the second mode allows access to users or terminals, regardless of the registration in the second NB, the second NB further grants access to at least one user or terminal not registered in the second NB, after changing the access mode, and if the first mode allows access to the users or the terminals, regardless of the registration in the second NB, and the second mode allows access only to the users or the terminals having the registration in the second NB, the second NB controls at least one user or terminal not registered in the second NB to handover to a neighbor NB.

In accordance with another aspect of the present invention, a method is provided for changing an access mode by a node B (NB) of a wireless communication system. The method includes receiving, from a core network or another NB, a request message requesting to change the access mode of the NB from a first mode into a second mode; determining to change the access mode; transmitting, to the core network or the another NB, a response message informing of an access mode control result; if the first mode allows access only to users or terminals having a registration in the NB, and the second mode allows access to users or terminals, regardless of the registration in the NB, further granting access to at least one user or terminal not registered in the NB, after changing the access mode; and if the first mode allows access to the users or the terminals, regardless of the registration in the NB, and the second mode allows access only to the users or the terminals having the registration in the NB, controlling at least one user or terminal not registered in the NB to handover to a neighbor NB.

In accordance with another aspect of the present invention, a method is provided for changing an access mode by a node B (NB) in a wireless communication system. The method includes determining to change the access mode of the NB from a first mode into a second mode; transmitting, to a core network (CN), a request message requesting to change the access mode of the NB; receiving, from the CN, a response message informing of an access mode control result to change the access mode; if the first mode allows access only to users or terminals having a registration in the NB, and the second mode allows access to users or terminals, regardless of the registration in the NB, further granting access to at least one user or terminal not registered in the NB, after changing the access mode; and if the first mode allows access to the users or the terminals, regardless of the registration in the NB, and the second mode allows access only to the users or the terminals having the registration in the NB, controlling at least one user or terminal not registered in the NB to handover to a neighbor NB.

In accordance with another aspect of the present invention, a first node B (NB) of a wireless communication system is provided, which changes an access mode of a second NB. The first NB includes a controller for determining to change the access mode of the second NB from a first mode into a second mode; a transmitter for transmitting, to the second NB, a request message requesting to change the access mode of the second NB; and a receiver for receiving, from the second NB, a response message informing of an access mode control result. If the first mode allows access only to users or terminals having a registration in the second NB, and the second mode allows access to users or terminals, regardless of the registration in the second NB, the second NB further grants access to at least one user or terminal not registered in the second NB, after changing the access mode, and if the first mode allows access to the users or the terminals, regardless of the registration in the second NB, and the second mode allows access only to the users or the terminals having the registration in the second NB, the second NB controls at least one user or terminal not registered in the second NB to handover to a neighbor NB.

In accordance with another aspect of the present invention, a node B (NB) of a wireless communication system is provided, which changes an access mode of the NB. The NB includes a controller for determining to change the access mode of the NB from a first mode into a second mode; a transmitter for transmitting, to a core network (CN), a request message requesting to change the access mode of the NB; and a receiver for receiving, from the CN, a response message informing of an access mode control result to change the access mode. If the first mode allows access only to users or terminals having a registration in the NB, and the second mode allows access to users or terminals, regardless of the registration in the NB, further grants access to at least one user or terminal not registered in the NB, after changing the access mode, and the controller, if the first mode allows access to the users or the terminals, regardless of the registration in the NB, and the second mode allows access only to the users or the terminals having the registration in the NB, controls at least one user or terminal not registered in the NB to handover to a neighbor NB.

In accordance with another aspect of the present invention, a node B (NB) of a wireless communication system is provided, which changes an access mode of the NB. The NB includes a receiver for receiving, from a core network (CN) or another NB, a request message requesting to change the access mode of the NB from a first mode into a second mode; a controller for determining whether to change the access mode; and a transmitter for transmitting, to the CN or the another NB, a response message informing of an access mode control result to change the access mode. The controller, if the first mode allows access only to users or terminals having a registration in the NB, and the second mode allows access to users or terminals, regardless of the registration in the NB, further grants access to at least one user or terminal not registered in the NB, after changing the access mode, and the controller, if the first mode allows access to the users or the terminals, regardless of the registration in the NB, and the second mode allows access only to the users or the terminals having the registration in the NB, controls at least one user or terminal not registered in the NB to handover to a neighbor NB.

In accordance with another aspect of the present invention, a method is provided for changing an access mode of a second node B (NB), by a first NB, of a wireless communication system. The method includes determining to change the access mode of the second NB from a first mode into a second mode; transmitting, to a core network (CN), a request message requesting to change the access mode of the second NB; and receiving, from the CN, a response message informing of an access mode control result to change the access mode. If the first mode allows access only to users or terminals having a registration in the second NB, and the second mode allows access to users or terminals, regardless of the registration in the second NB, the second NB further grants access to at least one user or terminal not registered in the second NB, after changing the access mode, and if the first mode allows access to the users or the terminals, regardless of the registration in the second NB, and the second mode allows access only to the users or the terminals having the registration in the second NB, the second NB controls at least one user or terminal not registered in the second NB to handover to a neighbor NB.

In accordance with another aspect of the present invention, a method is provided for changing an access mode of a second node B (NB), by a core network (CN), of a wireless communication system. The method includes determining to change the access mode of the second NB from a first mode into a second mode; transmitting, to the second NB, a request message requesting to change the access mode of the second NB; and receiving, from the second NB, a response message informing of an access mode control result to change the access mode. If the first mode allows access only to users or terminals having a registration in the second NB, and the second mode allows access to users or terminals, regardless of the registration in the second NB, the second NB further grants access to at least one user or terminal not registered in the second NB, after changing the access mode, and if the first mode allows access to the users or the terminals, regardless of the registration in the second NB, and the second mode allows access only to the users or the terminals having the registration in the second NB, the second NB controls at least one user or terminal not registered in the second NB to handover to a neighbor NB.

In accordance with another aspect of the present invention, a first node B (NB) of a wireless communication system is provided. The first NB includes a controller for determining to change an access mode of a second NB from a first mode into a second mode; a transmitter for transmitting, to core network (CN), a request message requesting to change the access mode of the second NB; and a receiver for receiving, from the CN, a response message informing of an access mode control result to change the access mode. If the first mode allows access only to users or terminals having a registration in the second NB, and the second mode allows access to users or terminals, regardless of the registration in the second NB, the second NB further grants access to at least one user or terminal not registered in the second NB, after changing the access mode, and if the first mode allows access to the users or the terminals, regardless of the registration in the second NB, and the second mode allows access only to the users or the terminals having the registration in the second NB, the second NB controls at least one user or terminal not registered in the second NB to handover to a neighbor NB.

In accordance with another aspect of the present invention, a method is provided for changing an access mode of a second node B (NB), by a first node NB, of a wireless communication system. The method includes determining to change the access mode of the second NB from a first mode into a second mode; transmitting, to the second NB, a request message requesting to change the access mode of the second NB; and receiving, from the second NB, a response message informing of an access mode control result to change the access mode. If the first mode allows access only to users or terminals having a registration in the second NB, and the second mode allows access to users or terminals, regardless of the registration in the second NB, the second NB further grants access to at least one user or terminal not registered in the second NB, after changing the access mode, and if the first mode allows access to the users or the terminals, regardless of the registration in the second NB, and the second mode allows access only to the users or the terminals having the registration in the second NB, the second NB controls at least one user or terminal not registered in the second NB to handover to a neighbor NB.

BRIEF DESCRIPTION OF THE DRAWINGS

The above and other aspects, features, and advantages of certain embodiments of the present invention will be more apparent from the following detailed description taken in conjunction with the accompanying drawings, in which.

Throughout the drawings, like reference numerals will be understood to refer to like parts, components and structures.

DETAILED DESCRIPTION OF EMBODIMENTS OF THE INVENTION

Figure 1:
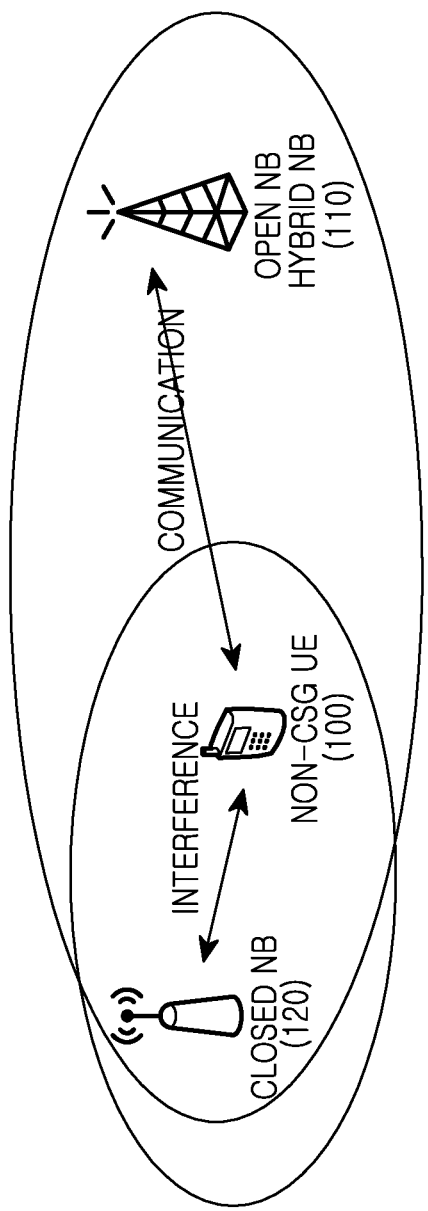
FIG. 1 illustrates an example of an interference factor of an access mode decision and change factors of an NB in a wireless communication system according to an embodiment of the present invention.

Various embodiments of the present invention are described herein below. The matters defined in the description such as detailed constructions and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the following description, a wireless communication system denotes, for example, a communication system that uses an Orthogonal Frequency Division Multiplexing (OFDM) scheme or an Orthogonal Frequency Division Multiple Access (OFDMA) scheme. Although certain embodiments of the present invention are described using a broadband wireless access communication system as an example, the present invention is also applicable to different wireless communication systems.

In the following description, an NB may be a macro NB or a femto NB. Further, an NB that operates in an open access mode is referred to as an open NB, an NB that operates in a closed access mode is referred to as a closed NB, and an NB that operates in a hybrid access mode is referred to as a hybrid NB. In addition, a UE that is registered in an NB that operates in the closed access mode and that is granted access is referred to as a closed user or a Closed Subscriber Group (CSG) UE, and the other UEs are referred to as open users or non-CSG UEs. Additionally, a coverage area of an NB that operates in an open access mode is referred to as an open cell, a coverage area of an NB that operates in a closed access mode is referred to as a closed cell, and a coverage area of an NB that operates in a hybrid access mode is referred to as a hybrid cell. Here, the closed cell may also be referred to as a CSG cell, and the open cell and the hybrid cell may also be referred to as a non-CSG cell.

In the following description, a Core Network (CN) denotes a Mobile Management Entity (MME), a Serving General packet radio service (GPRS) Support Node (SGSN), a Mobile Switching Center (MSC), an Access Control Router (ACR), Operations & Maintenance (OAM), a Gate-Way (GW), etc.

The determination to change a current access mode and selection of a new access mode of the NB may be performed right after a new NB is installed or power is turned on, and an access mode change during an operation may be performed due to the following other factors. Also, an access mode change may be performed right after a new NB is installed or power is turned on due to the following other factors.

1. Interference factor: When neighbor NBs use the same frequency and a non-CSG UE receives a service from an NB that utilizes an open access mode, i.e., an open NB, or an NB that utilizes a hybrid access mode, i.e., a hybrid NB, enters a coverage of an NB hat utilizes a closed access mode, i.e., a closed NB, a serious interference factor is generated between the neighbor NBs that use the different access modes, seriously deteriorating communication quality. In this case, to reduce the interference generated between the neighbor NBs, the closed NB may provide a service by temporarily changing its access mode and granting access to a non-CSG UE.

2. Load distribution necessity factor: When an amount of communication in an area will greatly increase, e.g., during a concert or sporting event, and a load of a cell of an NB will increase, load distribution may be required. In this case, with respect to a closed NB, when the access mode is temporarily changed to an open access mode with permission of a person who has installed the closed NB, the load of the cell may be distributed without a separate procedure.

When a CSG UE registered in a femto NB is located inside a coverage of the femto NB in operation in the open access mode, the femto NB may provide a service by temporarily changing its access mode and allowing access by the CSG UE.

Due to the change of an NB access mode by the above-described factors, system information such as a Physical Cell Identifier (PCI) for identifying cells, a CSG indicator representing whether a cell is a CSG cell, a CSG IDentifier (ID) for identifying CSG cells, etc., is changed, and an NB notifies a UE that receives a service from the NB that the system information has changed and informs the UE of the changed system information.

FIG. 1 illustrates an example of an interference factor of an NB in a wireless communication system according to an embodiment of the present invention.

Referring to FIG. 1, when neighbor NBs (open or hybrid NB 110 and closed NB 120) use the same frequency band and a non-CSG UE 100 receives a service from an open NB or a hybrid NB 110 enters a coverage of a closed NB 120, interference is generated between the neighbor NBs that use the different access modes.

The open NB or hybrid NB 110, which is a serving NB of the non-CSG UE 100 may recognize that a CSG cell exists near the non-CSG UE 100 through a measurement report message of the non-CSG UE 100. That is, the serving NB 110 may recognize that a communication environment of the non-CSG UE 100 is degrading and that the CSG cell is transmitting a strong signal exists through the measurement report message of the non-CSG UE 100. At this point, the communication between the non-CSG UE 100 and the serving NB 110 becomes an interference factor acting on the CSG cell, and a strong signal that the non-CSG UE 100 receives from the CSG cell deteriorates communication quality of the non-CSG UE 100.

When the non-CSG UE 100 receives a strong signal in the CSG cell, and the non-CSG UE 100 causes interference while moving with low speed and remaining in the area, the serving NB 110 requests the closed NB 120 to change an access mode and allows the closed NB 120 to accept the non-CSG UE 100, thereby solving the interference problem.

Figure 2:
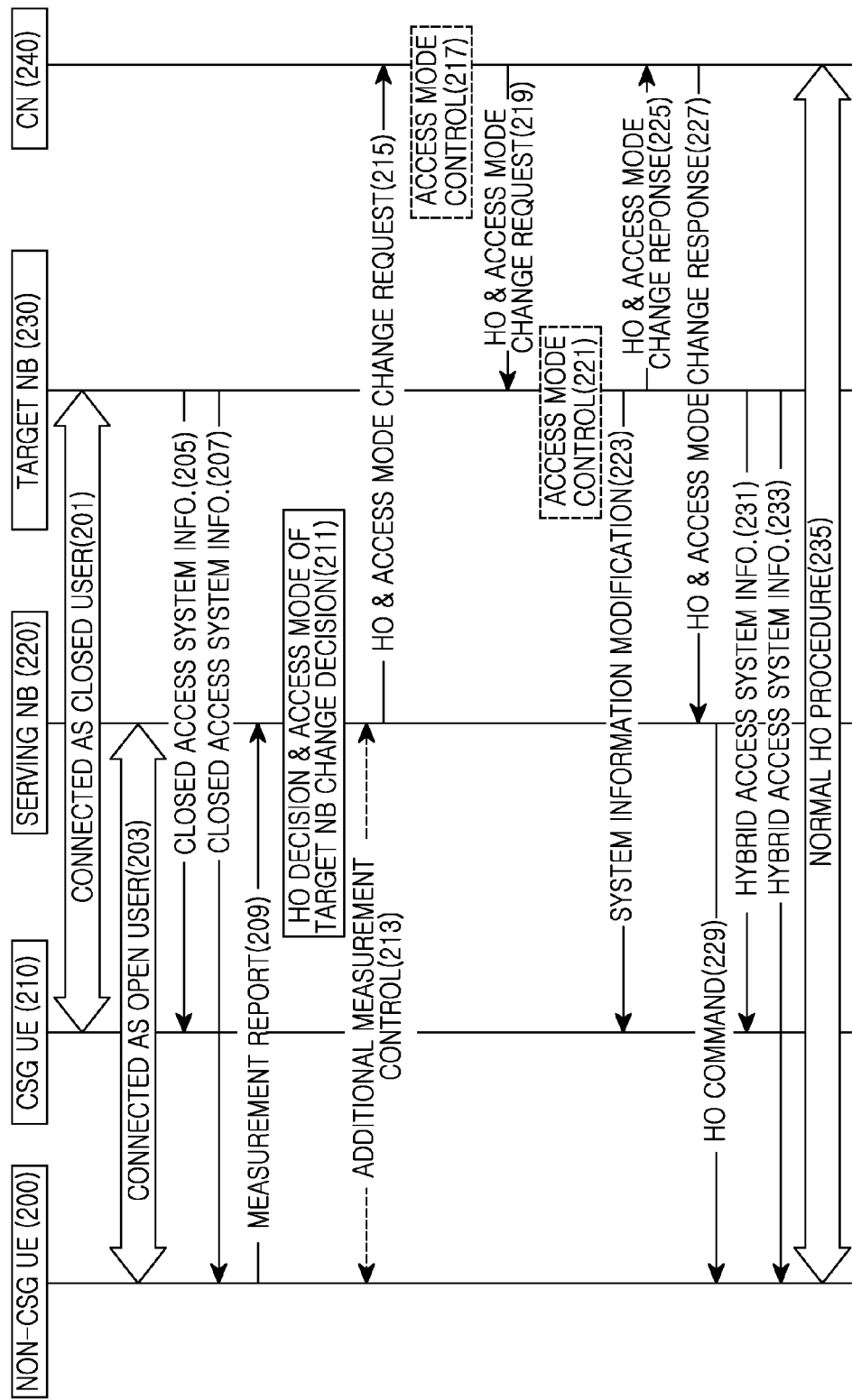
FIG. 2 is a signal flow illustrating a method for changing an NB access mode by an interference factor at an NB of a wireless communication system according to an embodiment of the present invention.

FIG. 2 is a signal flow illustrating a method for changing an NB access mode by an interference factor at an NB of a wireless communication system according to an embodiment of the present invention.

Referring to FIG. 2, it is assumed that a CSG UE 210 is connected to a closed NB 230 and receives a service in step 201, and a non-CSG UE 200 is connected to a open or hybrid NB 220 and receives a service in step 203. Under these assumptions, the non-CSG UE 200 enters a coverage of the closed NB 230, the CSG UE 210 and the non-CSG UE 200 receive closed access system info.-message transmitted by the closed NB 230 in step 205 and step 207, respectively. The non-CSG UE 200 may detect a CSG cell that transmits a strong signal, and recognize a PCI of the detected CSG cell through the system info.-message received from the detected CSG cell. Therefore, the non-CSG UE 200 informs its serving NB, i.e., the open or hybrid NB 220, of the PCI of the CSG cell that transmits a strong signal by transmitting a measurement report message to the serving NB 220 in step 209.

The serving NB 220 that has received the measurement report message from the non-CSG UE 200 determines whether the non-CSG UE 200 receives interference from the neighbor CSG cell, which is greater than a reference level, based on the PCI included in the measurement report message. If the non-CSG UE 200 receives interference that is greater than the reference level from the neighbor CSG cell, the non-CSG UE 200 may reduce the interference of the UE and improve communication quality by handing over the UE to the neighbor CSG cell, such that it receives a service from the neighbor CSG cell, i.e., the closed NB 230, rather than receiving a service from the serving NB 220. Therefore, when determining that the non-CSG UE 200 receives interference greater than the reference level from the neighbor CSG cell, in step 211, the serving NB 220 determines to perform a handover of the non-CSG UE 200, and determines an access mode change request to the closed NB 230, i.e., target NB, so that the target NB 230 may allow access of the non-CSG UE 200. Here, to prevent the handover decision and access mode change request decision from frequently occurring, the handover decision and the access mode change request decision may be performed when the non-CSG UE 200 receives interference greater than the reference level from the neighbor CSG cell and the velocity of the non-CSG UE 200 is less than a reference level.

To handover the non-CSG UE 200 and request an access mode change by the closed NB 230, the serving NB 220 requests additional CSG cell information, such as an Evolved Universal Mobile Telecommunications System (UMTS) Terrestrial Radio Access Network (E-UTRAN) Cell Global Identifier (ECGI), for more accurate cell identification than just the PCI, by transmitting an additional measurement control message to the non-CSG UE 200, in step 213. The non-CSG UE 200 collects the CSG cell information and transmits the collected information to the serving NB 220.

In step 215, the serving NB 220 transmits a Handover (HO) & access mode change request message to a CN 240 using the CSG cell information transmitted by the non-CSG UE 200. Here, the HO & access mode change request message requests the non-CSG UE 200 to perform a handover to the target NB 230, and requests the target NB 230 to change its access mode so that the non-CSG UE 200 may access the target NB 230. Though the handover request and the access mode change request are performed together in FIG. 2, they also may be performed separately, e.g., using two separate request messages.

The CN 240 controls an access mode of the target NB 230 in step 217. Specifically, when the CN 240 has an allowance authority regarding the handover and the access mode change, the CN 240 may determine whether to allow the handover and the access mode change through a separate handover & access mode change algorithm. However, when the CN 240 does not have the allowance authority regarding the handover and the access mode change, the CN 240 may determine allowance with respect to the handover and the access mode change unconditionally. When the CN 240 determines allowance regarding the handover of the non-CSG UE 200 and the access mode change of the target NB 230, the CN 240 transfers the HO & access mode change request message to the target NB 230 in step 219.

The target NB 230 controls its access mode in step 221. That is, the target NB 230 determines whether to accept the handover of the non-CSG UE 200, and determines whether to allow an access mode change so that the non-CSG UE 200 may access the target NB 230. When the target NB 230 is a femto NB, the target NB 230 may additionally receive an allowance from an owner of the femto NB to change the access mode.

The target NB 230 transmits an HO & access mode change response message including an access mode control result to the CN 240 in step 225, and the CN 240 transfers the HO & access mode change response message including a final access mode control result to the serving NB 220 in step 227. When allowance is determined with respect to the handover of the non-CSG UE 200 and the access mode change of the target NB 230 as the final access mode control result, the serving NB 220 orders the non-CSG UE 200 to perform the handover to the target NB 230 by transmitting a handover command message to the non-CSG UE 200 in step 229.

When the target NB 230 determines an allowance with respect to the handover of the non-CSG UE 200 and the access mode change of itself through the access mode control, the target NB 230 informs the CSG UE 210 that the access mode has changed, and accordingly the system information has changed, by transmitting a system information modification message to the CSG UE 210 in step 223. For example, the target NB 230 may change its access mode from a closed access mode to a hybrid access mode so that not only the CSG UE 210, but also the non-CSG UE 200, may access the target NB 230. In this case, the target NB 230 may transmit a hybrid access system info.-message including system information of the changed access mode to the CSG UE 210 and the non-CSG UE 200 in steps 231 and step 233.

In step 235, the non-CSG UE 200 accesses the target NB 230 and receives a service from the target NB 230 by performing a general handover procedure.

Though both the CN 240 and the target NB 230 perform the access mode control in FIG. 2, alternatively, only one of them may perform the access mode control.

In FIG. 2, the transfer of the HO & access mode change request message has been described using an example in which the serving NB 220 transfers the HO & access mode change request message to the target NB 230 via the CN 240. However, when direct communication, such as an X2 interface between NBs is possible, the serving NB 220 may directly transfer the HO & access mode change request message to the target NB 230, which will be described in more detail with reference to FIG. 3.

Figure 3:
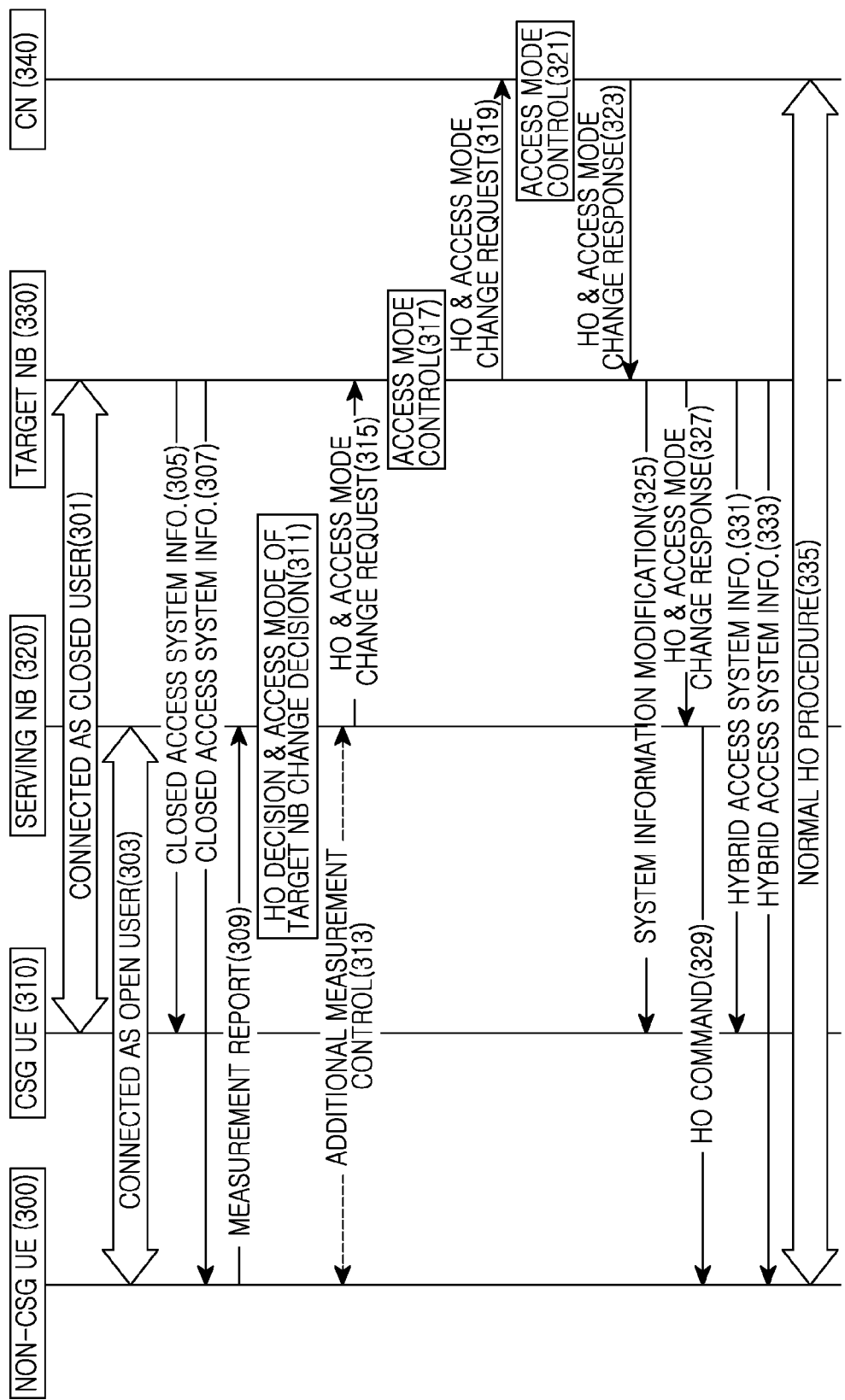
FIG. 3 is a signal flow illustrating a method for changing an NB access mode by an interference factor at an NB of a wireless communication system according to an embodiment of the present invention.

FIG. 3 is a signal flow illustrating a method for changing an NB access mode by an interference factor at an NB of a wireless communication system according to an embodiment of the present invention.

FIG. 3 is basically the same as FIG. 2, i.e., steps 201 to 213 of FIG. 2 are the same as steps 301 to 313 of FIG. 3, and thus, a repetitive description will be avoided.

Referring to FIG. 3, in step 315, a serving NB 320 transmits an HO & access mode change request message to a target NB 330 using CSG cell information transmitted by a non-CSG UE 300. Here, the HO & access mode change request message requests the non-CSG UE 300 to perform a handover to the target NB 330, and requests the target NB 330 to change its access mode so that the non-CSG UE 300 may access the target NB 330. Though the handover request and the access mode change request are performed together in FIG. 3, alternatively, they may be performed separately.

In step 317, the target NB 330 controls its access mode. That is, the target NB 330 determines whether to accept a call of the non-CSG UE 300, and determines whether to allow an access mode change so that the non-CSG UE 300 may access the target NB 330. If the target NB 330 is a femto NB, the target NB may additionally receiving an allowance from an owner of the femto NB to change the access mode.

When the target NB 330 determines an allowance with respect to the handover of the non-CSG UE 300 and the access mode change of the target NB 330, the target NB 330 transfers the HO & access mode change request message to a CN 340 in step 319.

In step 321, the CN 340 controls the access mode of the target NB 330. Specifically, when the CN 340 has an allowance authority regarding the handover and the access mode change, the CN 340 determines whether to allow the handover and the access mode change through a separate handover & access mode change algorithm. However, when the CN 340 does not have the allowance authority regarding the handover and the access mode change, the CN 340 may determine allowance with respect to the handover and the access mode change unconditionally.

The CN 340 transmits an HO & access mode change response message including an access mode control result to the target NB 330 in step 323, and the target NB 330 transfers an HO & access mode change response message including a final access mode control result to the serving NB 320 in step 327. When allowance is determined with respect to the handover of the non-CSG UE 300 and the access mode change of the target NB 330 as the final access mode control result, the serving NB 320 may order the non-CSG UE 300 to perform the handover to the target NB 330 by transmitting a handover command message to the non-CSG UE 300 in step 329.

When the target NB 330 determines an allowance with respect to the handover of the non-CSG UE 300 and its access mode change as the final access mode control result, the target NB 330 informs the CSG UE 310 that the access mode has changed, and accordingly that the system information has changed, by transmitting a system information modification message to the CSG UE 310 in step 325. For example, the target NB 330 may change its access mode to a hybrid access mode so that not only the CSG UE 310, but also the non-CSG UE 300, may access the target NB 330. In this case, the target NB 330 may transmit a hybrid access system info.-message including system information of the changed access mode to the CSG UE 310 and the non-CSG UE 300 in step 331 and step 333, respectively.

The non-CSG UE 300 accesses the target NB 330 and receives a service from the target NB 330 by performing a general handover procedure in step 335.

Though both the CN 340 and the target NB 330 perform the access mode control in FIG. 3, alternatively, only one of them may perform the access mode control. That is, the target NB 330 that has received an HO & access mode change request message from the serving NB 320 may directly transmit an HO & access mode change response message, including only an access mode control performance result of the target NB, to the serving NB 320.

Figure 4:
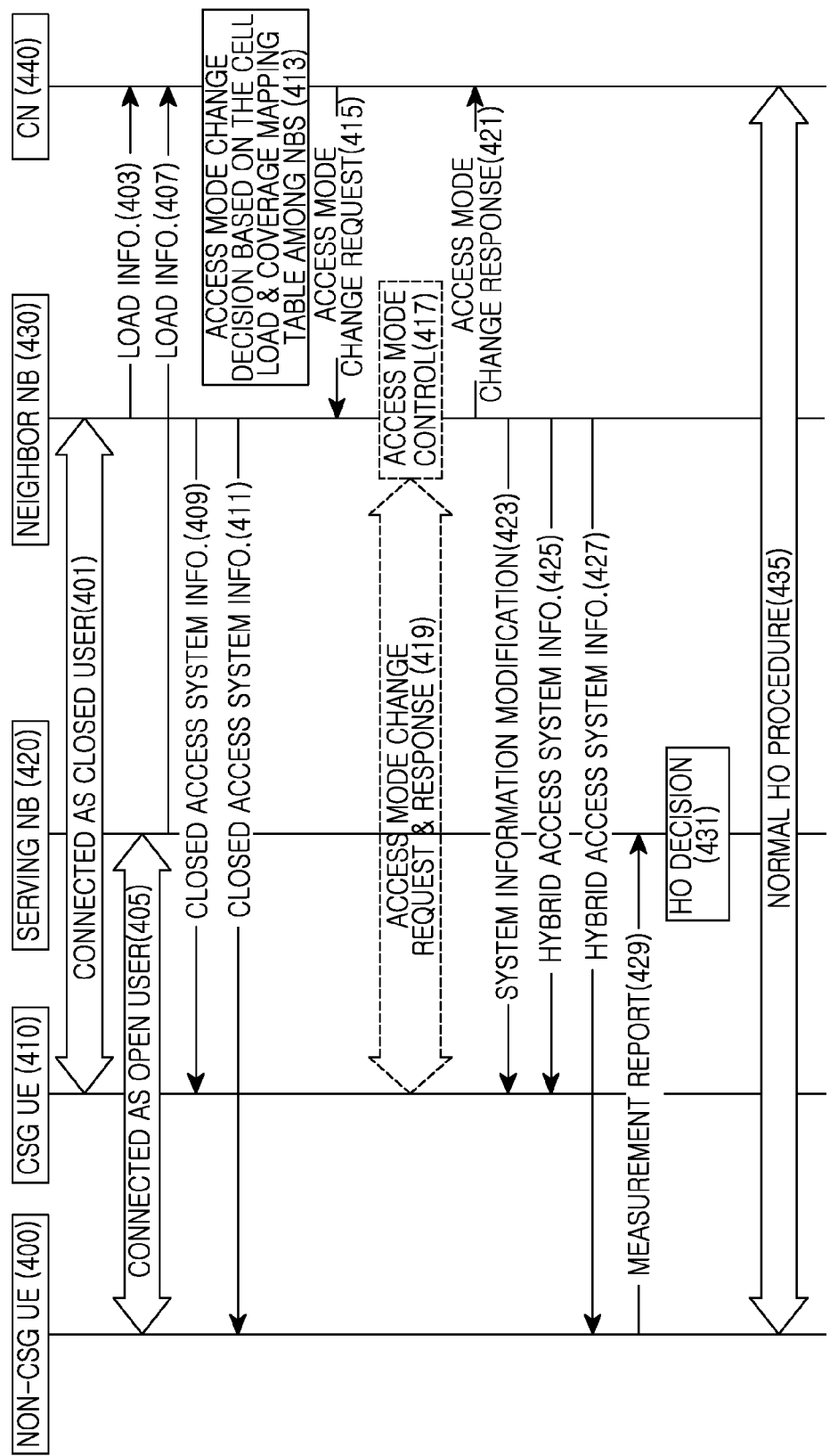
FIG. 4 is a signal flow illustrating a method for changing an NB access mode by a cell load distribution necessity factor at an NB of a wireless communication system according to an embodiment of the present invention.

FIG. 4 is a signal flow illustrating a method for changing an NB access mode by a cell load distribution necessity factor at an NB of a wireless communication system according to an embodiment of the present invention.

Referring to FIG. 4, it is assumed that a CSG UE 410 is connected to a closed NB 430 as a closed user to receive a service in step 401, and a non-CSG UE 400 is connected to an open or hybrid NB 420 as an open user to receive a service in step 405. In addition, it is assumed that the closed NB 430, which is a neighbor NB to the non-CSG UE 400, and open or hybrid NB, i.e., the serving NB, 420 of the non-CSG UE 400 transmit load info.-messages including cell load information to a CN 440 in step 403 and step 407, respectively. Based on these assumptions, the non-CSG UE 400 enters a coverage of the neighbor NB 430, the CSG UE 410 and the non-CSG UE 400 receive closed access system info.-messages transmitted by the neighbor NB 430 of the closed access mode in steps 409 and 411, respectively.

The CN 440 determines whether an NB whose cell load is greater than a reference level and an NB whose cell load is less than the reference level exist among NBs whose coverage areas overlap, based on the load information for each cell and an inter-NB coverage mapping table. If an NB whose cell load is greater than the reference level and an NB whose cell load is less than the reference level exist among the NBs with overlapping coverage areas, the CN 440 may distribute a cell load by changing an access mode of the NB whose cell load is less than the reference level so that a UE that receives a service from an NB whose cell load is greater than the reference level may perform a handover to the NB whose cell load is less than the reference level.

Referring to FIG. 4, when an NB whose cell load is greater than the reference level and an NB whose cell load is less than the reference level exist among the NBs with overlapping coverage areas, the CN 440 determines whether to request the NB whose cell load is less than the reference level to change an access mode in step 413. For example, when the coverage areas of the serving NB 420 and the neighbor NB 430 of the non-CSG UE 400 overlap each other, and the cell load of the serving NB 420 is greater than the reference level and the cell load of the neighbor NB 430 is less than the reference level, the CN 440 determines to request the neighbor NB 430 to change an access mode so that the non-CSG UE 400 may perform a handover to the neighbor NB 430 whose cell load is less than the reference level and receive service from the neighbor NB 430.

In step 415, the CN 440 transmits an access mode change request message to the neighbor NB 430. Here, the access mode change request message requests the neighbor NB 430 to change its access mode so that the non-CSG UE 400 may access the neighbor NB 430.

In step 417, the neighbor NB 430 controls its access mode. Specifically, the neighbor NB 430 determines whether to allow its access mode to change so that the non-CSG UE 400 may access the neighbor NB 430. When the neighbor NB 430 is a femto NB, the neighbor NB may additionally receive an allowance from an owner of the femto NB to change its access mode. That is, the neighbor NB may transmit an access mode change request message to the owner 410 of the femto NB and receive an access mode change response message from the owner 410 of the femto NB in step 419.

In step 421, the neighbor NB 430 transmits an access mode change response message including an access mode control result to the CN 440. When determining an allowance with respect to its access mode, the neighbor NB 430 informs the CSG UE 410 that the access mode has changed, and accordingly, that the system information has changed, by transmitting a system information modification message to the CSG UE 410 in step 423. For example, the neighbor NB 430 may change its access mode to a hybrid access mode so that not only the CSG UE 410, but also the non-CSG UE 400, may access the neighbor NB 430. In this case, the neighbor NB 430 may transmit a hybrid access system info.-message including system information of the changed access mode to the CSG UE 410 and the non-CSG UE 400 in steps 425 and 427, respectively.

In step 429, the non-CSG UE 400 generates a measurement report message based on the system info.-message received from the neighbor NB 430, and transmits the same to the serving NB 420. The serving NB 420 determines a handover of the non-CSG UE 400 based on the measurement report message in step 431. When the serving NB transmits a handover command message to the non-CSG UE 400 according to the handover decision of the non-CSG UE 400, the non-CSG UE 400 is connected to the neighbor NB 430 and receives a service from the neighbor NB 430 by performing a general handover procedure in step 433.

In FIG. 4, the CN 440 requests an NB whose cell load is less than a reference level to change an access mode to allow a UE inside a coverage area of an NB whose cell load is greater than the reference level to access the NB whose cell load is less than the reference level and receive service from the NB whose cell load is less than the reference level. Specifically, FIG. 4 illustrates the changing an access mode of an NB based on a request by a CN. However, it is also possible for an access mode of an NB to be changed based on a request of a neighbor NB. That is, an NB whose cell load is greater than a reference level may request an NB whose cell load is less than the reference level to change an access mode, which will be described in more detail with reference to FIG. 5.

As another example, an NB may spontaneously request to change its access mode. That is, an NB whose cell load is less than a reference level may request to change its own access mode, which will be described in more detail with reference to FIG. 6.

Figure 5:
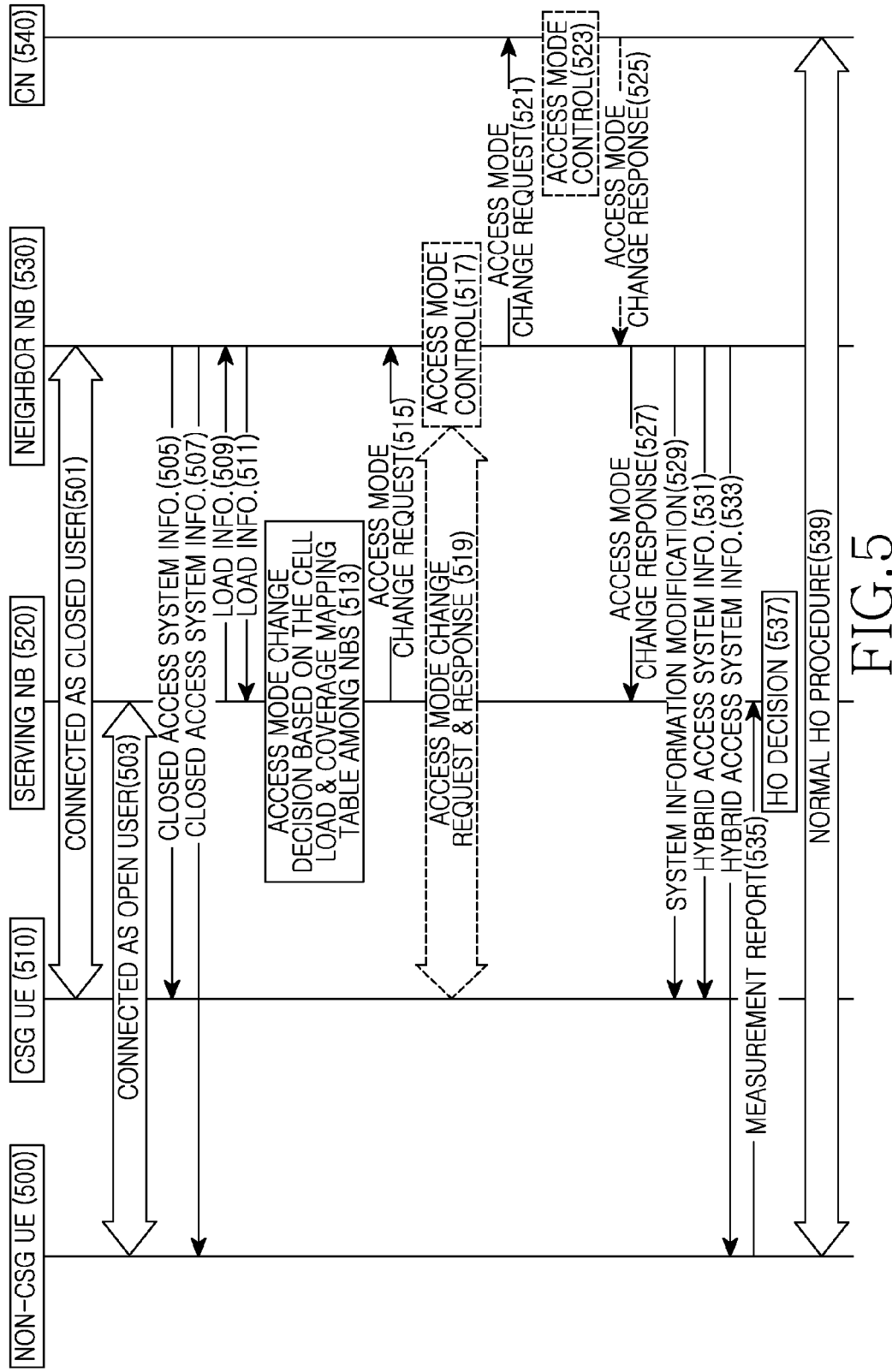
FIG. 5 is a signal flow illustrating a method for changing an NB access mode by a cell load distribution necessity factor at an NB of a wireless communication system according to an embodiment of the present invention.

FIG. 5 is a signal flow illustrating a method for changing an NB access mode by a cell load distribution necessity factor at an NB of a wireless communication system according to an embodiment of the present invention.

Referring to FIG. 5, it is assumed that a CSG UE 510 is connected to a closed NB 530 as a closed user to receive a service in step 501, and a non-CSG UE 500 is connected to a open or hybrid NB 520 as an open user to receive a service in step 503. Under these assumptions, the non-CSG UE 500 enters a coverage area of the closed NB 530, which is a neighbor NB, and the CSG UE 510 and the non-CSG UE 500 receive closed access system info.-messages transmitted by the neighbor NB 530 in steps 505 and 507, respectively.

In addition, NBs 520 and 530 exchange a load info.-message, including cell load information, with each other in steps 509 and 511. The NBs 520 and 530 determine whether an NB whose cell load is greater than a reference level and an NB whose cell load is less than the reference level exist among NBs including the NBs 520 and 530, whose coverage areas overlaps those of the NBs 520 and 530, based on the load information for each cell collected through the load info.-message exchange and an inter-NB coverage mapping table.

When an NB whose cell load is greater than the reference level and an NB whose cell load is less than the reference level exist among the NBs whose coverage areas overlap, the NBs 520 and 530 may distribute the cell load by changing an access mode of the NB whose cell load is less than the reference level so that a UE that receives a service from the NB whose cell load is greater than the reference level may perform a handover to the NB whose cell load is less than the reference level. Therefore, when an NB whose cell load is greater than the reference level and an NB whose cell load is less than the reference level exist among the NBs whose coverage areas overlap those of the NBs 520 and 530, the NB 520 or 530 determines whether the NB whose cell load is greater than the reference level is itself, and when the NB is itself, the NB 520 or 530 determines to request the NB whose cell load is less than the reference level to change an access mode in step 513.

For example, when the coverage of the serving NB 520 of the non-CSG UE 500 overlaps the coverage of the neighbor NB 530, the cell load of the serving NB 520 is greater than the reference level, and the cell load of the neighbor NB 530 is less than the reference level, the serving NB 520 determines whether to request the neighbor NB 530 to change an access mode so that the non-CSG UE 500 may perform a handover to the neighbor NB 530 whose cell load is less than the reference level to receive a service from the neighbor NB 530.

More specifically, the serving NB 520 transmits an access mode change request message to the neighbor NB 530 in step 515. Here, the access mode change request message requests the neighbor NB 530 to change its access mode so that the non-CSG UE 500 may access the neighbor NB 530.

In step 517, the neighbor NB 530 controls its access mode. Specifically, the neighbor NB 530 determines whether to allow its access mode to change so that the non-CSG UE 500 may access the neighbor NB 530.

When the neighbor NB 530 is a femto NB, the neighbor NB 530 may additionally receive an allowance from an owner of the femto NB to change the access mode. That is, the neighbor NB 530 may additionally transmit an access mode change request message to the owner 510 of the femto NB and receive an access mode change response message from the owner 510 of the femto NB in step 519.

When the neighbor NB 530 determines to allow its access mode to change, the neighbor NB 530 transfers the access mode change request message to a CN 540 in step 521.

In step 523, the CN 540 controls an access mode of the neighbor NB 530. Specifically, when the CN 540 has an allowance authority regarding the access mode change, the CN 540 may determine whether to allow the access mode change through a separate access mode change algorithm. However, when the CN 540 does not have the allowance authority regarding the access mode change, the CN 540 may unconditionally determine allowance with respect to the access mode change.

In step 525, the CN 540 transmits an access mode change response message including an access mode control result to the neighbor NB 530, and in step 527, the neighbor NB 530 transfers an access mode change response message including a final access mode control result to the serving NB 520.

When determining an allowance with respect to its access mode change as the final access mode control result, the neighbor NB 530 informs the CSG UE 510 that the access mode has changed, and accordingly, that the system information has changed, by transmitting a system information modification message to the CSG UE 510 in step 529. For example, the neighbor NB 530 may change its access mode to a hybrid access mode so that the CSG UE 510 and also the non-CSG UE 500 may access the neighbor NB 530. In this case, the neighbor NB 530 may transmit a hybrid access system info.-message including system information of the changed access mode to the CSG UE 510 and the non-CSG UE 500 in steps 531 and 533, respectively.

In step 535, the non-CSG UE 500 generates a measurement report message based on the system info.-message received from the neighbor NB 530, and transmits the same to the serving NB 520. The serving NB 520 determines a handover of the non-CSG UE 500 based on the measurement report message in step 537. When the serving NB 520 transmits a handover command message to the non-CSG UE 500 according to a handover decision of the non-CSG UE 500, the non-CSG UE 500 receives a service from the neighbor NB 530 by performing a general handover procedure and accessing the neighbor NB 530 in step 539.

Figure 6:
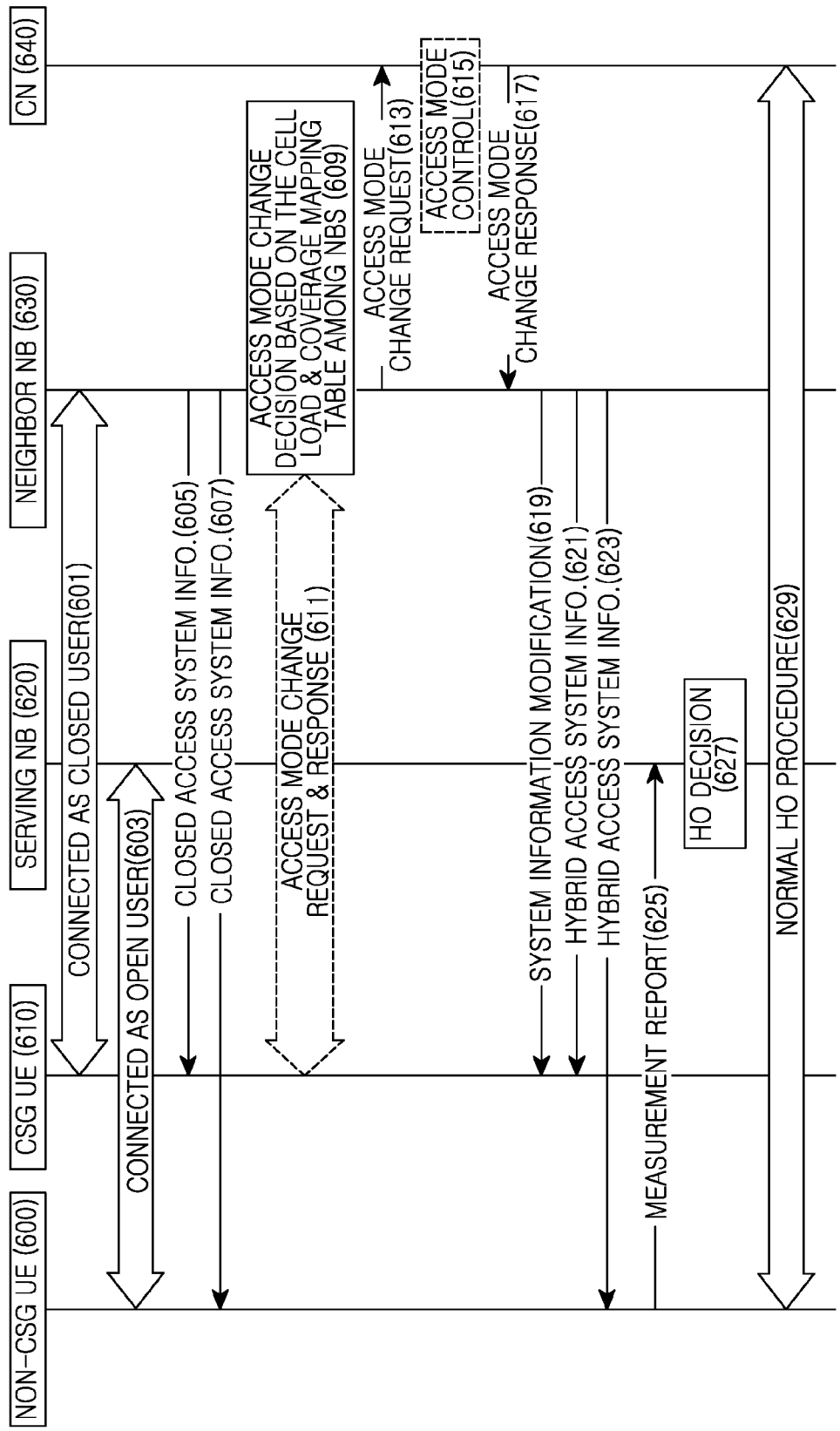
FIG. 6 is a signal flow illustrating a method for changing an NB access mode by a cell load distribution necessity factor at an NB of a wireless communication system according to an embodiment of the present invention.

FIG. 6 is a signal flow illustrating a method for changing an NB access mode by a cell load distribution necessity factor at an NB of a wireless communication system according to an embodiment of the present invention.

Referring to FIG. 6, it is assumed that a CSG UE 610 is connected to a closed NB 630 as a closed user to receive a service in step 601, and a non-CSG UE 600 is connected to an open or hybrid NB 620 as an open user to receive a service in step 603. Under these assumptions, the non-CSG UE 600 enters a coverage of the closed NB 630, which is a neighbor NB, and the CSG UE 610 and the non-CSG UE 600 receive closed access system info.-message transmitted by the neighbor NB 630 in steps 605 and 607, respectively.

In addition, the NBs 620 and 630 exchange load info.-message including cell load information with each other. The NBs 620 and 630 determine whether an NB whose cell load is greater than a reference level and an NB whose cell load is less than the reference level exist among NBs including the NBs 620 and 630, whose coverage areas overlap those of the NBs 620 and 630, based on the load information for each cell collected through the load info.-message exchange and an inter-NB coverage mapping table.

When an NB whose cell load is greater than the reference level and an NB whose cell load is less than the reference level exist among the NBs whose coverage areas overlap, the NBs 620 and 630 may distribute the cell load by changing an access mode of the NB whose cell load is less than the reference level so that a UE that receives a service from the NB whose cell load is greater than the reference level may perform a handover to the NB whose cell load is less than the reference level.

Therefore, when an NB whose cell load is greater than the reference level and an NB whose cell load is less than the reference level exist among the NBs whose coverage areas overlap those of the NBs 620 and 630, the NB 620 or 630 determines whether the NB whose cell load is less than the reference level is itself, and when the NB is itself, the NB 620 or 630 determines whether to change its own access mode in step 609.

For example, when the coverage area of the serving NB 620 of the non-CSG UE 600 overlap the coverage area of the neighbor NB 630, the cell load of the serving NB 620 is greater than the reference level, and the cell load of the neighbor NB 630 is less than the reference level, the neighbor NB 630 determines to change its access mode so that the non-CSG UE 600 may perform a handover to the neighbor NB 630 to receive service from the neighbor NB 630.

Additionally, when the neighbor NB 630 is a femto NB, the neighbor NB may additionally receive an allowance from an owner of the femto NB to change the access mode. That is, the neighbor NB may additionally transmit an access mode change request message to the owner 610 of the femto NB and receive an access mode change response message from the owner 610 of the femto NB in step 611.

The neighbor NB 630 transmits an access mode change request message to the CN 640 in step 613. Here, the access mode change request message requests the neighbor NB 630 to change its access mode so that the non-CSG UE 600 may access the neighbor NB 630.

In step 615, the CN 640 controls the access mode of the neighbor NB 630. Specifically, when the CN 640 has an allowance authority regarding the access mode change, the CN 640 may determine whether to allow the access mode change through a separate access mode change algorithm. However, when the CN 640 does not have the allowance authority regarding the access mode change, the CN 640 may unconditionally determine an allowance with respect to the access mode change.

The CN 640 transmits an access mode change response message including an access mode control result to the neighbor NB 630 in step 617. When determining an allowance with respect to the access mode change of the neighbor NB 630, the neighbor NB 630 informs the CSG UE 610 that the access mode has changed, and accordingly, that the system information has changed, by transmitting a system information modification message to the CSG UE 610 in step 619.

For example, the neighbor NB 630 may change its own access mode to a hybrid access mode so that the CSG UE 610 and the non-CSG UE 600 may access the neighbor NB 630. In this case, the neighbor NB 630 may transmit hybrid access system info.-messages including system information of the changed access mode to the CSG UE 610 and the non-CSG UE 600 in steps 621 and 623, respectively.

In step 625, the non-CSG UE 600 generates a measurement report message based on the system info.-message received from the neighbor NB 630, and transmits the same to the serving NB 620 of the non-CSG UE 600. The serving NB 620 determines a handover of the non-CSG UE 600 based on the measurement report message in step 627. When the serving NB 620 transmits a handover command message to the non-CSG UE 600, the non-CSG UE 600 is connected to the neighbor NB 630 in order to receive service from the neighbor NB 630 by performing a general handover procedure in step 629.

Figure 7:
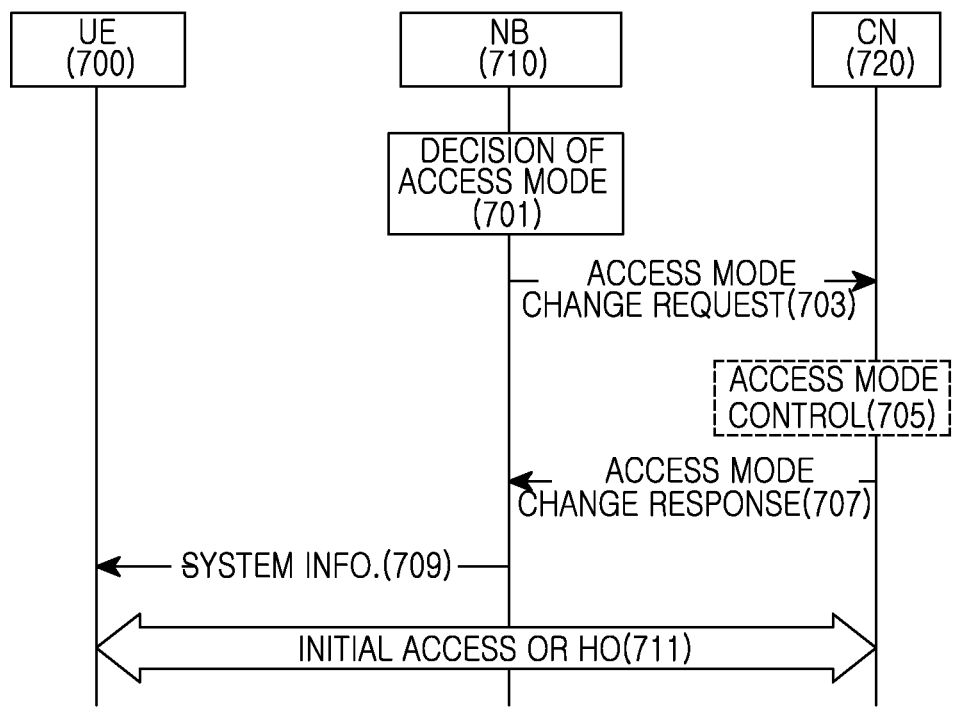
FIG. 7 is a signal flow illustrating a management method for determining, at an NB, an access mode, and reporting the access mode to a Core Network (CN) in a wireless communication system according to an embodiment of the present invention.

FIG. 7 is a signal flow illustrating a management method for determining, by a NB, an access mode of the NB, and reporting the access mode to a CN in a wireless communication system according to an embodiment of the present invention.

Referring to FIG. 7, a NB 710 determines its own access mode in step 710, and reports the determined access mode by transmitting an access mode change request message to a CN 720 in step 703.

In step 705, the CN 720 controls the access mode of the NB 710. Specifically, when the CN 720 has an allowance authority regarding the access mode decision, the CN 720 may determine whether to allow the access mode decision or determine a different access mode and allocate a suitable PCI through a separate access mode decision algorithm. However, when the CN 720 does not have the allowance authority regarding the access mode decision, the CN 720 may unconditionally determine an allowance with respect to the access mode decision, and allocate a suitable PCI.

In step 707, the CN 720 transmits an access mode change response message including an access mode control result to the NB 710. When the CN 720 determines an allowance with respect to the access mode decision of the NB 710 through the access mode control, the NB 710 transmits a system info.-message including system information of the determined access mode to a UE 700 in step 709.

The UE 700 generates a measurement report message based on the system info.-message received from the NB 710, and transmits the measurement report message to the serving NB to try a handover to the NB 710 or perform an initial access procedure to the NB 710 in step 711.

Figure 8:
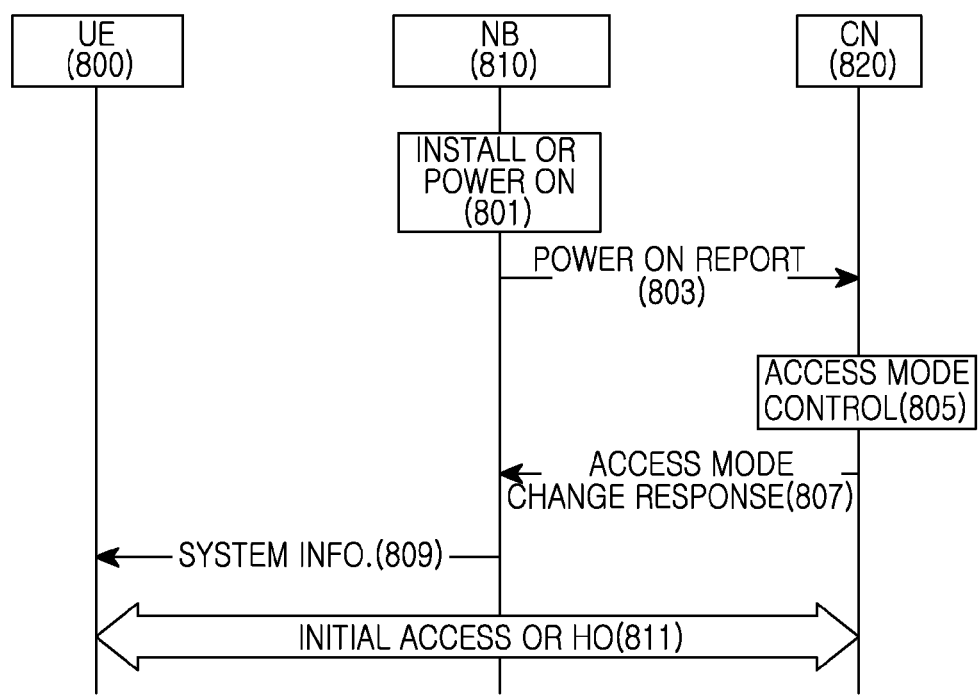
FIG. 8 is a signal flow illustrating a management method for determining, at a CN, an access mode of an NB and reporting the access mode to the NB in a wireless communication system according to an embodiment of the present invention.

FIG. 8 is a signal flow illustrating a management method for determining, by a CN, an access mode of an NB and reporting the access mode to the NB in a wireless communication system, according to an embodiment of the present invention.

Referring to FIG. 8, when an NB 810 is installed or is powered on in step 801, the NB 810 transmits a power-on-report message to a CN 820 in step 803.

The CN 820 controls an access mode of the NB 810 in step 805. Specifically, the CN 820 determines the access mode of the NB 810 through a separate access mode decision algorithm, and allocates a suitable PCI. The CN 820 transmits an access mode change response message including an access mode control result to the NB 810 in step 807.

In step 809, the NB 810 transmits a system info.-message including system information of the determined access mode to a UE 800.

The UE 800 generates a measurement report message based on the system info.-message received from the NB 800, and transmits the measurement report message to the serving NB to try a handover to the NB 810 or to perform an initial access procedure to the NB 810 in step 811.

Figure 9:
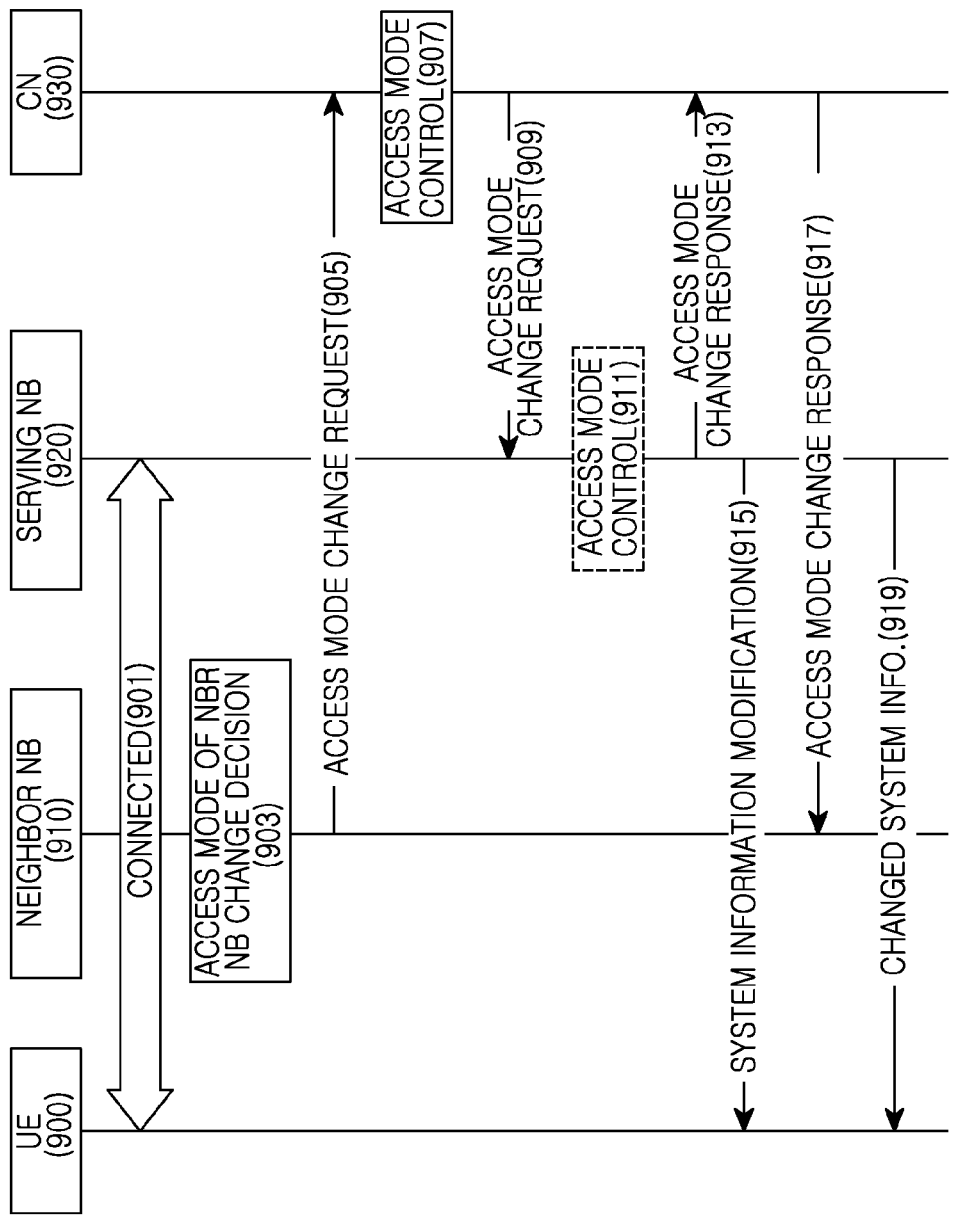
FIG. 9 is a signal flow illustrating a management method for requesting, by a neighbor NB, an NB to change an access mode for the purpose of reducing an inter-cell interference in a wireless communication system according to an embodiment of the present invention.

FIG. 9 is a signal flow illustrating a management method for requesting, by a neighbor NB, an NB to change an access mode for the purpose of reducing an inter-cell interference in a wireless communication system according to an embodiment of the present invention.

Referring to FIG. 9, a UE 900 is connected to a serving NB 920 to receive a service from the serving NB 920 in step 901.

A neighbor NB 910 of the UE 900 determines to request a peripheral NB to change an access mode for the purpose of reducing an inter-cell interference in step 903. For example, the neighbor NB 910 may requests the serving NB 920 to change its access mode. The following description is described using the above example.

In step 905, the neighbor NB 910 transmits an access mode change request message to a CN 930. Here, the access mode change request message requests the serving NB 920 to change the access mode.

The CN 930 controls the access mode of the serving NB 920 in step 907. Specifically, when the CN 930 has an allowance authority regarding the access mode change, the CN 930 may determine whether to allow the access mode change through a separate access mode change algorithm. However, when the CN 930 does not have the allowance authority regarding the access mode change, the CN 930 may unconditionally determine allowance with respect to the access mode change.

When determining to allow the access mode change of the serving NB 920, the CN 930 transfers the access mode change request message to the serving NB 920 in step 909.

The serving NB 920 that has received the access mode change request message controls its own access mode in step 911. That is, the serving NB 920 determines whether to allow its access mode to change.

When the serving NB 920 is a femto NB, the serving NB 920 may additionally receive an allowance from an owner of the femto NB to change the access mode.

In step 913, the serving NB 920 transmits an access mode change response message including an access mode control result to the CN 930, and in step 917, the CN 930 transfers the access mode change response message including the final access mode control result to the neighbor NB 910.

When determining to allow the access mode change of the serving NB 920, the serving NB 920 informs the UE 900 that the access mode has changed, and accordingly, that the system information has changed, by transmitting a system information modification message to the UE 900 in step 915. In addition, the serving NB 920 may transmit a changed system info.-message including system information of the changed access mode to the UE 900 in step 919.

In conjunction with FIG. 9, the transfer of the access mode change request message has been described using an example in which the neighbor NB 910 transfers the access mode change request message to the serving NB 920 via the CN 930. However, when direct communication, such as an X2 interface between NBs is possible, the neighbor NB 910 may directly transfer the access mode change request message to the serving NB 920, which will be described in more detail with reference to FIG. 10.

Figure 10:
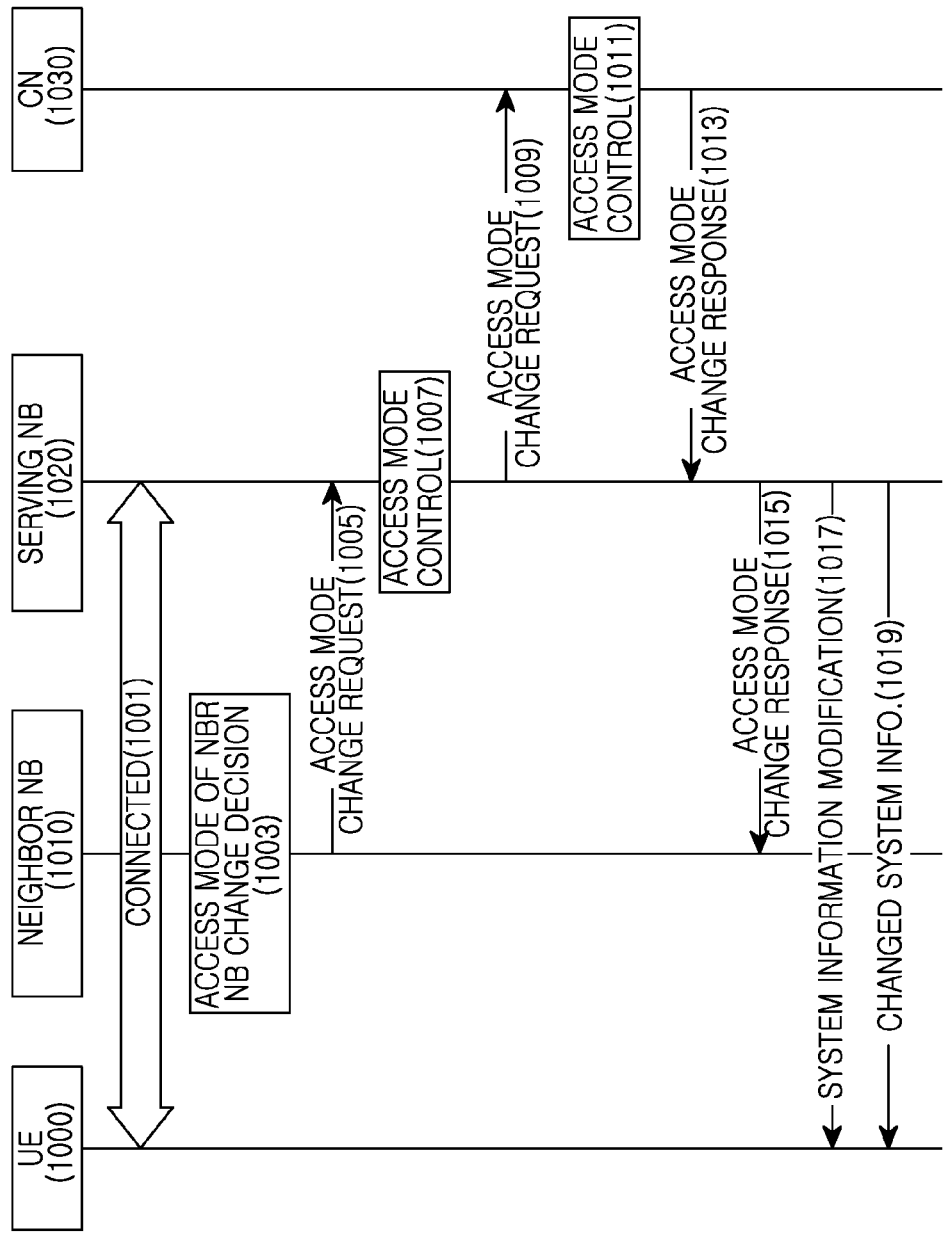
FIG. 10 is a signal flow illustrating a management method for requesting, by a neighbor NB, an NB to change an access mode for the purpose of reducing an inter-cell interference in a wireless communication system according to an embodiment of the present invention.

FIG. 10 is a signal flow illustrating a management method for requesting, by a neighbor NB, an NB to change an access mode for the purpose of reducing an inter-cell interference in a wireless communication system according to an embodiment of the present invention.

Referring to FIG. 10, a UE 1000 is connected to a serving NB 1020 to receive a service from the serving NB 1020 in step 1001.

A neighbor NB 1010 of the UE 1000 may determine to request a peripheral NB to change an access mode for the purpose of reducing an inter-cell interference in step 1003.

For example, the neighbor NB may request the serving NB 1020 to change its access mode. The following description is made using the above example.

The neighbor NB 1010 transmits an access mode change request message to the serving NB 1020 in step 1005. Here, the access mode change request message requests the serving NB 1020 to change the access mode.

In step 1007, the serving NB 1020 controls its own access mode. That is, the serving NB 1020 determines whether to allow its access mode to change.

When the serving NB 1020 is a femto NB, the serving NB may additionally receive an allowance from an owner of the femto NB to change the access mode.

When determining to allow its access mode change, the serving NB 1020 transfers the access mode change request message to a CN 1030 in step 1009.

The CN 1030 that has received the access mode change request message controls the access mode of the serving NB 1020 in step 1011. Specifically, when the CN 1030 has an allowance authority regarding the access mode change, the CN 1030 may determine whether to allow the access mode change through a separate access mode change algorithm. However, when the CN 1030 does not have the allowance authority regarding the access mode change, the CN 1030 may unconditionally determine allowance with respect to the access mode change.

The CN 1030 transmits an access mode change response message including an access mode control result to the serving NB 1020 in step 1013. The serving NB 1020 transfers the access mode change response message including the final access mode control result to the neighbor NB 1010 in step 1015.

Alternatively, instead of the two messages in steps 1013 and 1015, the CN 1030 may directly transfer the access mode change response message including the access mode control result to the neighbor NB 1010.

When determining to allow its access mode change, the serving NB 1020 informs the UE 1000 that the access mode has changed, and accordingly, that system information has changed, by transmitting a system information modification message to the UE 1000 in step 1017. In addition, the serving NB 1020 may transmit a system info.-message including system information of the changed access mode to the UE 1000 in step 1019.

Table 1 summarizes an operating method of an NB according to an access mode change of the NB.

TABLE 1

| existing | changing | | |
|---|---|---|---|
| | Closed | Hybrid | Open |
| Closed | — | treats existing CSG UE considerately (case 3) | it is possible in the case where there is not CSG UE (case 5) |
| Hybrid | commands open user to handover (case 1) | — | it is possible in the case where there is not CSG UE (case 6) |
| Open | commands open user to handover (case 2) | treats existing CSG UE considerately, and commands open user to handover depending on a resource shortage (case 4) | — |

Referring to Table 1, when an access mode change occurs, an NB notifies a system information change to a UE communicating with the NB in a previous access mode. Of course, in cases of cases 1 and 2 above, which allow all UEs that operate in a previous access mode to perform a handover, such a system information change notice is not required.

In cases 3 and 5, when an NB that is requested to change an access mode is a femto NB, receiving an allowance from an owner of the femto NB to change the access mode may be additionally performed.

FIG. 1 is a signal flow illustrating an operating method for cases 1 and 2 of Table 1, for changing an access mode of an NB from a hybrid access mode or an open access mode to a closed access mode in a wireless communication system according to an embodiment of the present invention.

Figure 11:
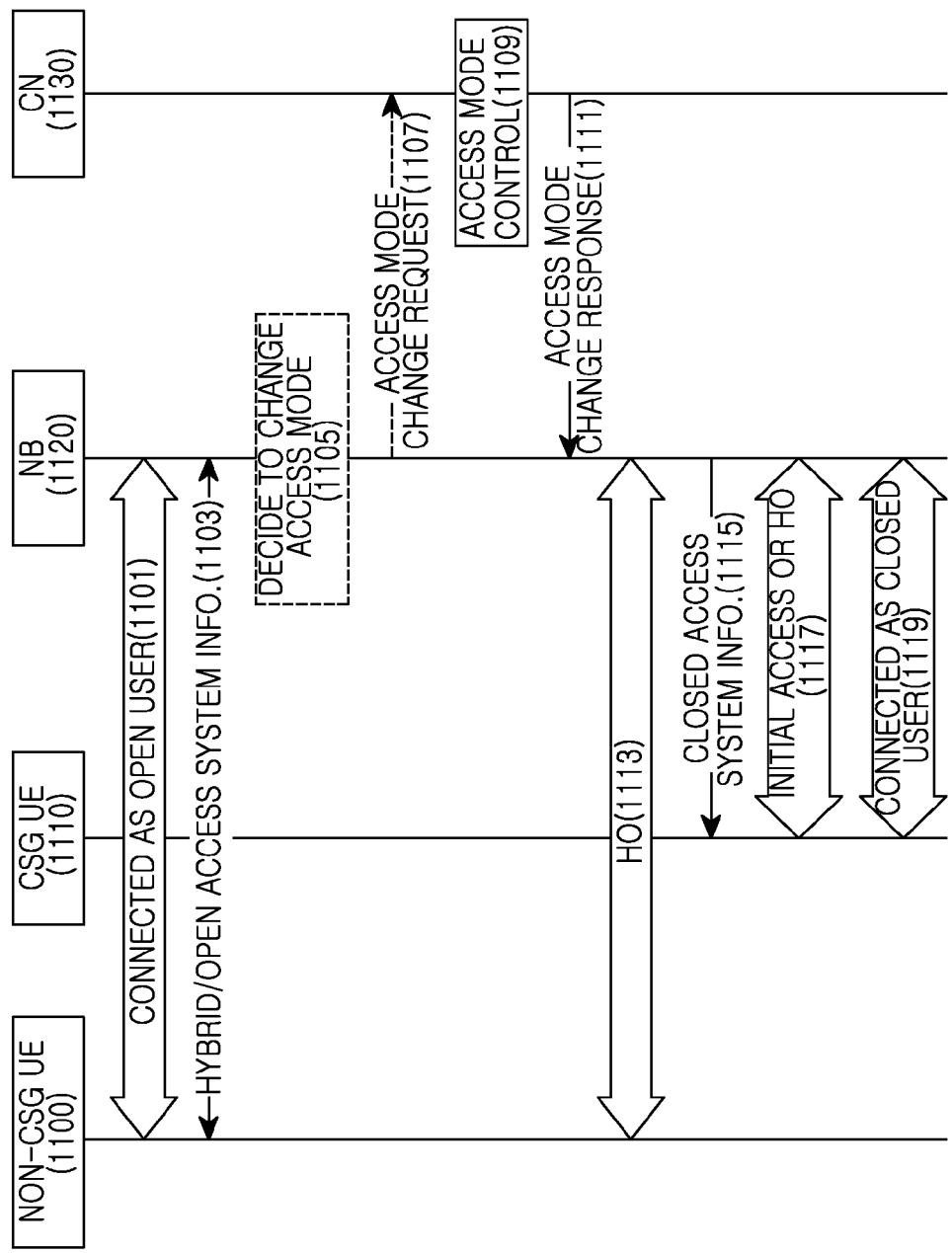
FIG. 11 is a signal flow illustrating an operating method for cases 1 and 2 for changing an access mode of an NB from a hybrid access mode or an open access mode to a closed access mode in a wireless communication system according to an embodiment of the present invention.

Referring to FIG. 11, a non-CSG UE 1100 is connected to an open or hybrid NB 1120 as an open user to receive a service in step 1101. In step 1103, the non-CSG UE 1100 receives hybrid/open access system info.-message transmitted by a serving NB 1120 of the non-CSG UE 1100.

In step 1105, the NB 1120 may determine to change its access mode to a closed access mode. When determining to change its access mode, the NB 1120 reports the access mode change to a CN 1130 by transmitting an access mode change request message to the CN 1130 in step 1107.

In step 1109, the CN 1130 controls the access mode of the NB 1120. Specifically, when the CN 1130 has an allowance authority regarding the access mode decision, the CN 1130 may determine whether to allow the access mode decision or determine a different access mode and allocate a suitable PCI through a separate access mode decision algorithm. However, when the CN 1130 does not have the allowance authority regarding the access mode decision, the CN 1130 may unconditionally determine an allowance with respect to the access mode decision, and allocate a suitable PCI.

The CN 1130 transmits an access mode change response message including an access mode control result to the NB 1120 in step 1111. When the CN 1130 determines to allow the access mode decision of the NB 1120, the NB 1120 orders the non-CSG UE 1100 to perform a handover in step 1113, and transmits a closed access system info.-message including system information of the determined changed access mode to the CSG UE 1110 in step 1115.

The CSG UE 1110 generates a measurement report message based on the system info.-message received from the NB 1120, and transmits the measurement report message to the serving NB to try a handover to the NB 1120 or perform an initial access procedure to the NB 1120 in step 1117. In step 1119, the CSG UE 1110 is connected to the NB 1120, now in the closed access mode, to receive service.

Figure 12:
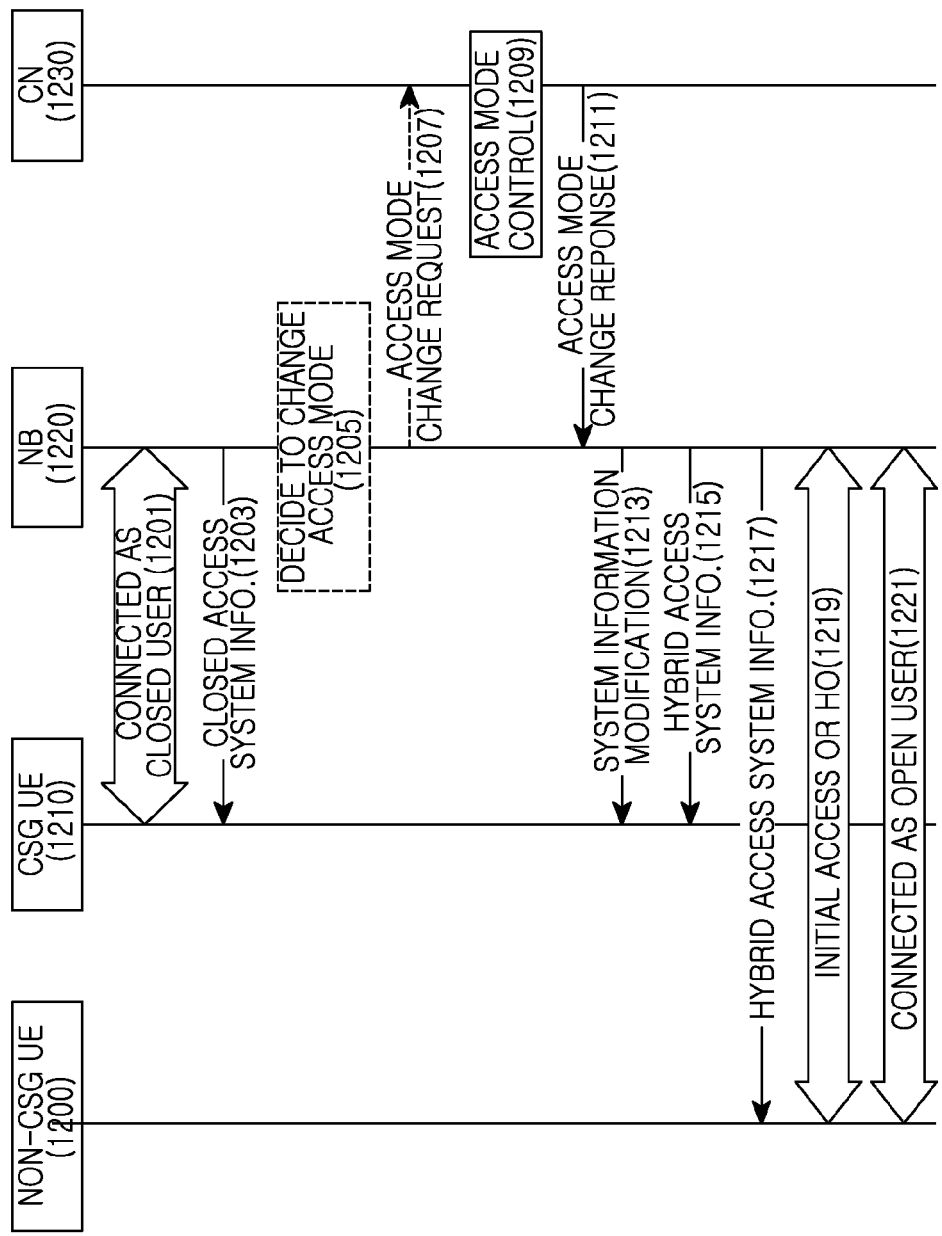
FIG. 12 is a signal flow illustrating an operating method for case 3 for changing an access mode of an NB from a closed access mode to a hybrid access mode in a wireless communication system according to an embodiment of the present invention.

FIG. 12 is a signal flow illustrating an operating method for case 3 of Table 1, for changing an access mode of an NB from a closed access mode to a hybrid access mode in a wireless communication system according to an embodiment of the present invention.

Referring to FIG. 12, a CSG UE 1210 is connected to a closed NB (serving NB) 1220 as a closed user to receive service in step 1201. In step 1203, the CSG UE 1210 receives a closed access system info.-message transmitted by the serving NB 1220.

The NB 1220 may determine to change its access mode from a closed access mode to a hybrid access mode in step 1205. When determining to change its access mode, the NB 1220 transmits an access mode change request message to the CN 1230 in step 1207.

In step 1209, the CN 1230 controls the access mode of the NB 1220. Specifically, when the CN 1230 has an allowance authority regarding the access mode decision, the CN 1230 may determine whether to allow the access mode decision or determine a different access mode and allocate a suitable PCI through a separate access mode decision algorithm. However, when the CN 1230 does not have the allowance authority regarding the access mode decision, the CN 1230 may unconditionally determine an allowance with respect to the access mode decision, and allocate a suitable PCI.

In step 1211, the CN 1230 transmits an access mode change response message including an access mode control result to the NB 1220. When the CN 1230 determines to allow the access mode decision of the NB 1220, the NB 1220 informs the CSG UE 1210 that the access mode has changed, and accordingly, that system information has changed, by transmitting a system information modification message to the CSG UE 1210 in step 1213. In addition, the NB 1220 transmits a hybrid access system info.-message including system information of the changed access mode to the CSG UE 1210 and a non-CSG UE 1200 in steps 1215 and 1217, respectively.

In step 1219, the non-CSG UE 1200 generates a measurement report message based on the system information message received from the NB 1220, and transmits the measurement report message to the serving NB to try a handover to the NB 1220 or perform an initial access procedure to the NB 1220. In step 1221, the non-CSG UE 1200 is connected to the NB 1220 of the hybrid access mode as an open user to receive service.

Figure 13:
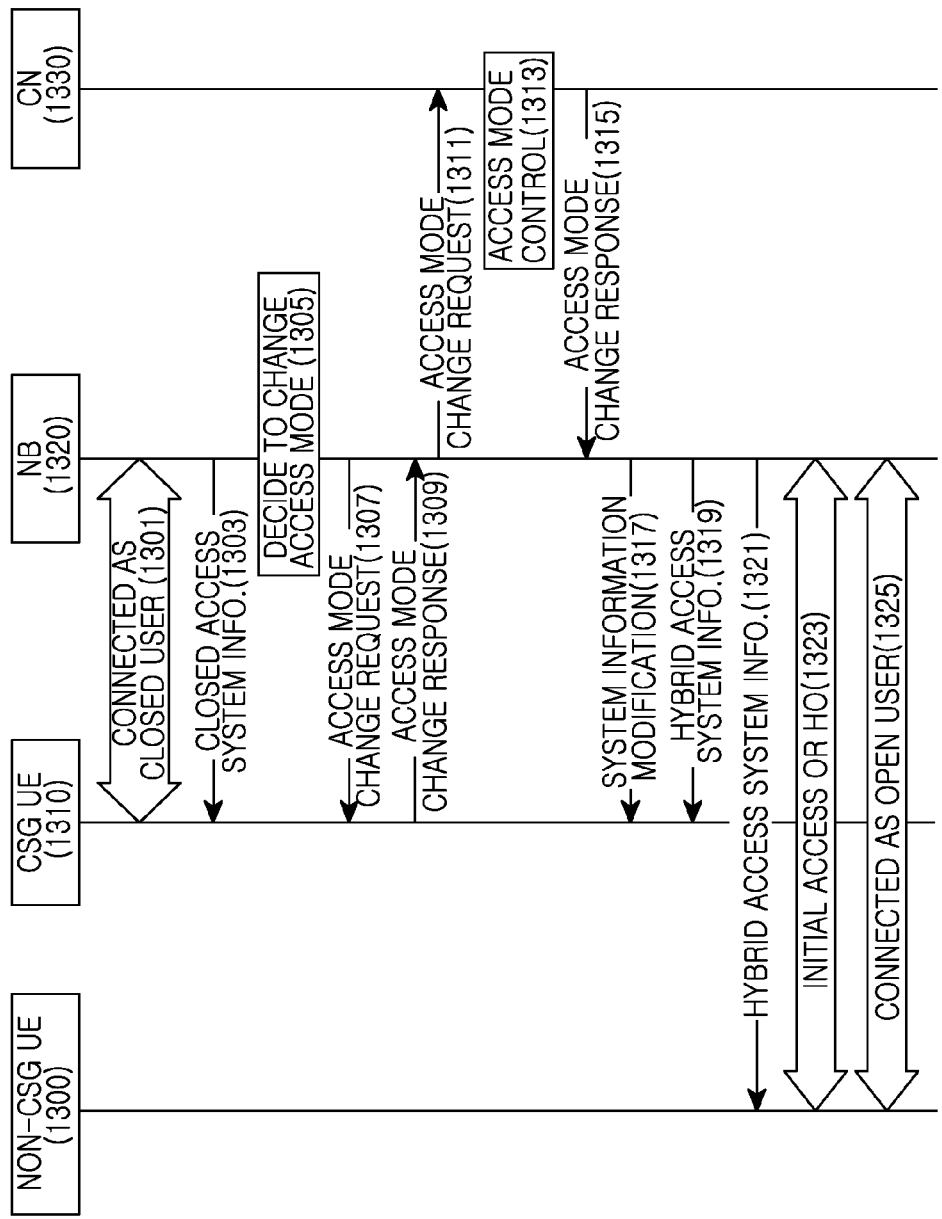
FIG. 13 is a signal flow illustrating an operating method for case 3 for changing an access mode of an NB from a closed access mode to a hybrid access mode in a wireless communication system according to an embodiment of the present invention.

In FIG. 12, when the NB 1220 is a femto NB, the NB may additionally receive an allowance from an owner of the femto NB to change the access mode. That is, as illustrated in FIG. 13, when determining to change its access mode from a closed access mode to a hybrid access mode in step 1305, an NB 1320 may additionally transmit an access mode change request message to the owner 1310 of the femto NB in step 1307, and receives an access mode change response message from the owner 1310 of the femto NB in step 1309. Because the remaining steps in FIG. 13, i.e., Steps 1301, 1303, and 1311-1325, are the same as those of FIG. 12, a repetitive detailed description thereof is omitted.

Though description has been made using an example where an NB requests a CN to change its access mode with reference to FIGS. 12 and 13, the CN may request the NB to change its access mode, which will be described in more detail with reference to FIG. 14.

Figure 14:
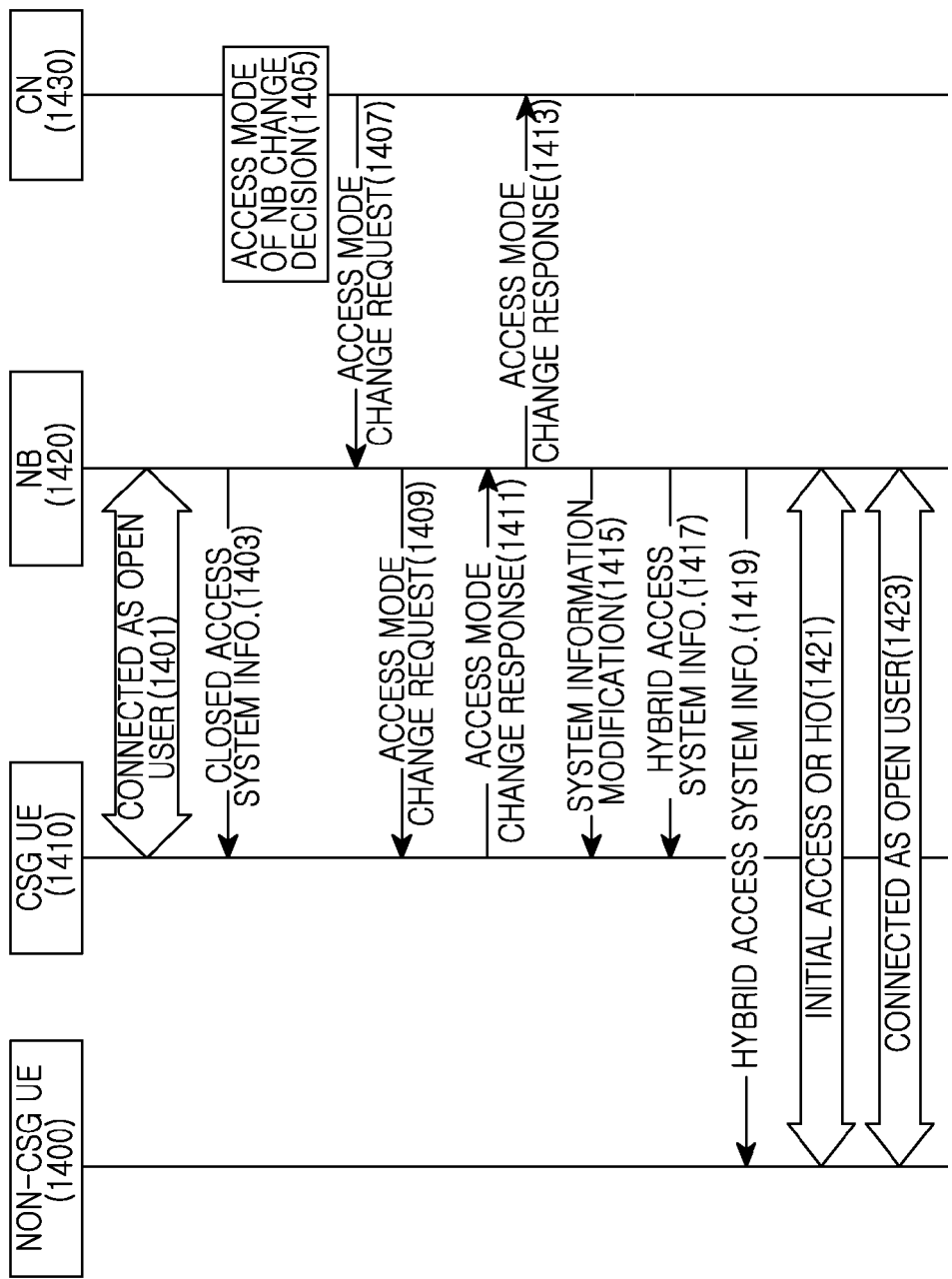
FIG. 14 is a signal flow illustrating an operating method for case 3 for changing an access mode of an NB from a closed access mode to a hybrid access mode in a wireless communication system according to an embodiment of the present invention.

FIG. 14 is a signal flow illustrating an operating method for case 3 in Table, for changing an access mode of an NB from a closed access mode to a hybrid access mode in a wireless communication system according to an embodiment of the present invention.

Referring to FIG. 14, a CSG UE 1410 is connected to a closed NB (serving NB) 1420 as a closed user to receive service in step 1401. In step 1403, the CSG UE 1410 receives a closed access system info.-message transmitted by the serving NB 1420 of the CSG UE 1410.

A CN 1430 may determine to change the access mode of the NB 1420 from the closed access mode to a hybrid access mode in step 1405. When determining to change the access mode of the NB 1420, the CN 1430 requests the NB 1420 to change the access mode by transmitting an access mode change request message to the NB 1420 in step 1407.

When the NB 1420 is a femto NB, the NB 1420 may additionally receive an allowance from an owner of the femto NB to change the access mode. That is, the NB 1420 may additionally transmit an access mode change request message to the owner 1410 of the femto NB in step 1409, and receive an access mode change response message from the owner 1410 of the femto NB in step 1411.

The NB 1420 transmits an access mode change response message including an access mode change response to the CN 1430 in step 1413. When the owner 1410 of the femto NB allows the access mode change, the NB 1420 informs the CSG UE 1410 that the access mode has changed, and accordingly, that system information has changed, by transmitting a system information modification message to the CSG UE 1410 in step 1415. In addition, the NB 1420 transmits a hybrid access system info.-message including system information of the changed access mode to the CSG UE 1410 and a non-CSG UE 1400 in steps 1417 and 1419, respectively.

In step 1421, the non-CSG UE 1400 generates a measurement report message based on the system information message received from the NB 1420, and transmits the measurement report message to the serving NB to try a handover to the NB 1420 or perform an initial access procedure to the NB 1420. In step 1423, the non-CSG UE 1400 is connected to the NB 1420, now operating in the hybrid access mode, as an open user to receive service.

Figure 15:
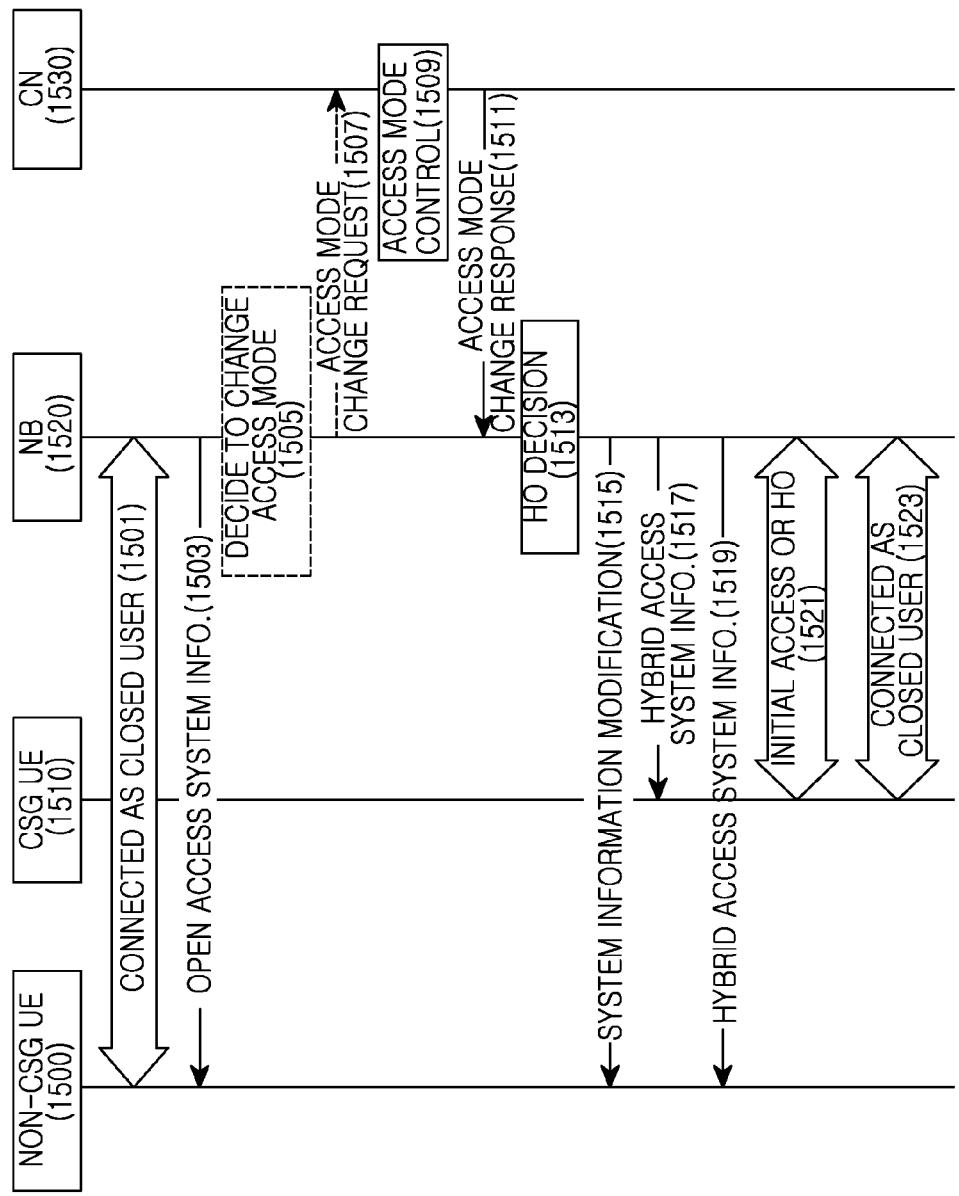
FIG. 15 is a signal flow illustrating an operating method for case 4 for changing an access mode of an NB from an open access mode to a hybrid access mode in a wireless communication system according to an embodiment of the present invention.

FIG. 15 is a signal flow illustrating an operating method for case 4 of Table 1, for changing an access mode of an NB from an open access mode to a hybrid access mode in a wireless communication system according to an embodiment of the present invention.

Referring to FIG. 15, a non-CSG UE 1500 is connected to an open NB (serving NB) 1520 as an open user to receive service in step 1501. In step 1503, the non-CSG UE 1500 receives an open access system info.-message transmitted by the serving NB 1520.

The NB 1520 may determine to change its access mode to a hybrid access mode in step 1505. When determining to change its access mode, the NB 1520 transmits an access mode change request message to the CN 1530 in step 1507.

In step 1509, the CN 1530 controls an access mode of the NB 1520. Specifically, when the CN 1530 has an allowance authority regarding the access mode decision, the CN 1530 may determine whether to allow the access mode decision or determine a different access mode and allocate a suitable PCI through a separate access mode decision algorithm. However, when the CN 1530 does not have the allowance authority regarding the access mode decision, the CN 1530 may unconditionally determine an allowance with respect to the access mode decision, and allocate a suitable PCI.

In step 1511, the CN 1530 transmits an access mode change response message including an access mode control result to the NB 1520. When the CN 1530 determines an allowance with respect to the access mode decision of the NB 1520, the NB 1520 may determine a handover of the non-CSG UE 1500 depending on a resource shortage in step 1513. In addition, the NB 1520 informs the non-CSG UE 1500 that the access mode has changed, and accordingly, that system information has changed, by transmitting a system information modification message to the non-CSG UE 1500 in step 1515. In addition, the NB 1520 transmits a hybrid access system info.-message including system information of the changed access mode to the non-CSG UE 1500 and a CSG UE 1510 in steps 1517 and 1519, respectively.

In step 1521, the CSG UE 1510 generates a measurement report message based on the system information message received from the NB 1520, and transmits the measurement report message to the serving NB to try a handover to the NB 1520 or perform an initial access procedure to the NB 1520. In step 1523, the CSG UE 1510 is connected to the NB 1520, now operating in the hybrid access mode, as a closed user to receive a service.

Because cases 5 and 6 are the same as the foregoing, repetitive detailed descriptions thereof are omitted.

Figure 16:
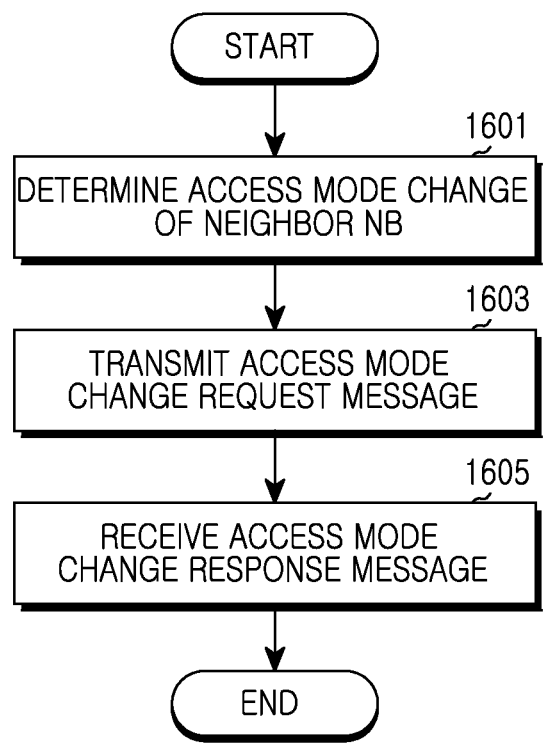
FIG. 16 is a flowchart illustrating an operating method of an NB, for changing an access mode of a neighbor NB according to a request from the NB in a wireless communication system according to an embodiment of the present invention.

FIG. 16 is a flowchart illustrating an operating method of an NB, for changing an access mode of a neighbor NB according to a request of the NB in a wireless communication system according to an embodiment of the present invention.

Referring to FIG. 16, the NB determines to change an access mode of a neighbor NB for the purpose of reducing interference or distributing a cell load in step 1601. In step 1603, the NB transmits, to a CN or directly to the neighbor NB, an access mode change request message requesting the neighbor NB to change the access mode, and in step 1605, receives an access mode change response message including an access mode control result from the CN or the neighbor NB.

Figure 17:
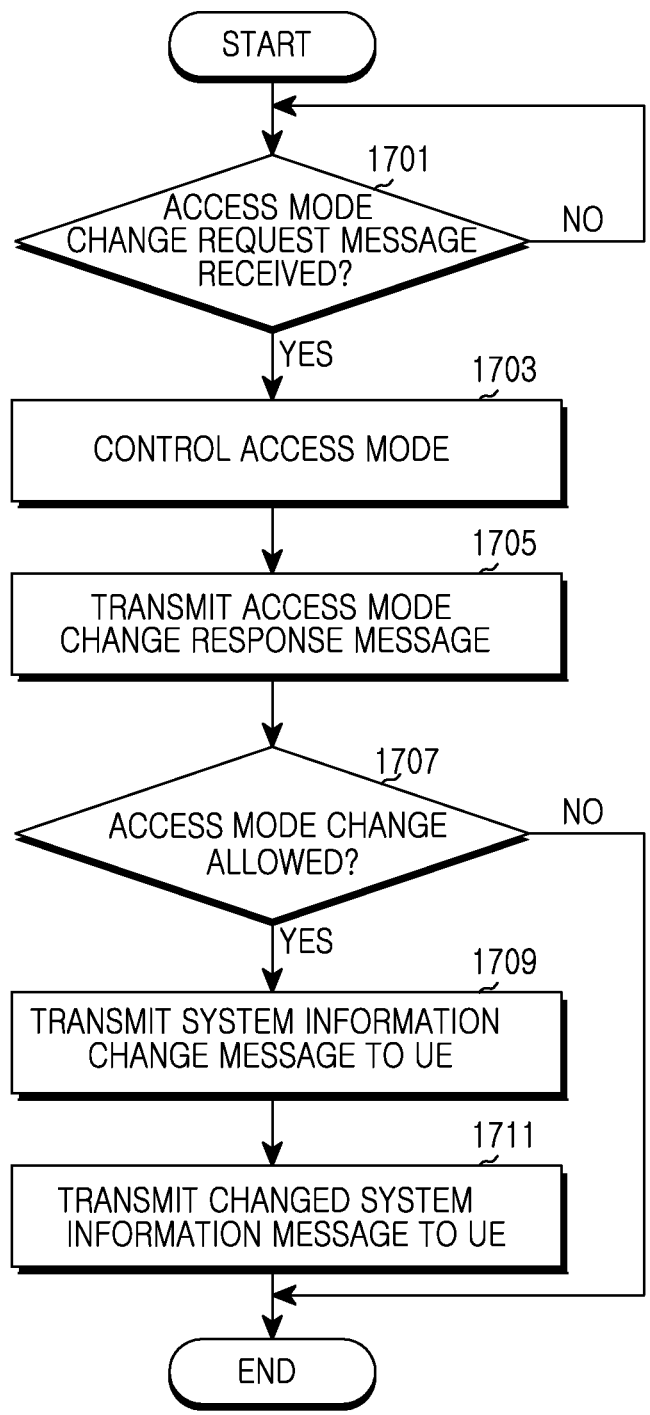
FIG. 17 is a flowchart illustrating an operating method of a neighbor NB, for changing an access mode of the neighbor NB according to a request from an NB in a wireless communication system according to an embodiment of the present invention.

FIG. 17 is a flowchart illustrating an operating method of a neighbor NB, for changing its access mode according to a request of an NB in a wireless communication system, according to an embodiment of the present invention.

Referring to FIG. 17, in step 1701, a neighbor NB determines whether an access mode change request message requesting the neighbor NB to change an access mode is received from a CN or directly from an NB.

When the access mode change request message requesting the neighbor NB to change the access mode is received from the CN or directly from the NB, the neighbor NB controls its access mode in step 1703. That is, the neighbor NB determines whether to allow its access mode to change.

When the neighbor NB is a femto NB, the neighbor NB may additionally receive an allowance from an owner of the femto NB to change the access mode. In addition, the neighbor NB may transfer the access mode change request message to the CN, receive an access mode change response message including an access mode control result from the CN, and finally determine whether to allow the access mode change of itself based on an access mode control result performed by the CN and an access mode control result performed by the neighbor NB.

The neighbor NB transmits an access mode change response message including a final access mode control result to the CN or the NB in step 1705.

The neighbor NB determines whether an allowance has been determined with respect to the access mode change of the neighbor NB as a final access mode control result in step 1707.

When the access mode change of the neighbor NB is not allowed in step 1707, the neighbor NB ends the procedure.

However, when the access mode change of the neighbor NB is allowed in step 1707, the neighbor NB informs a UE that the access mode has changed, and accordingly, that system information has changed, by transmitting a system information modification message to the UE in step 1709. In step 1711, the neighbor NB transmits a system information message including system information of the changed access mode to the UE.

Figure 18:
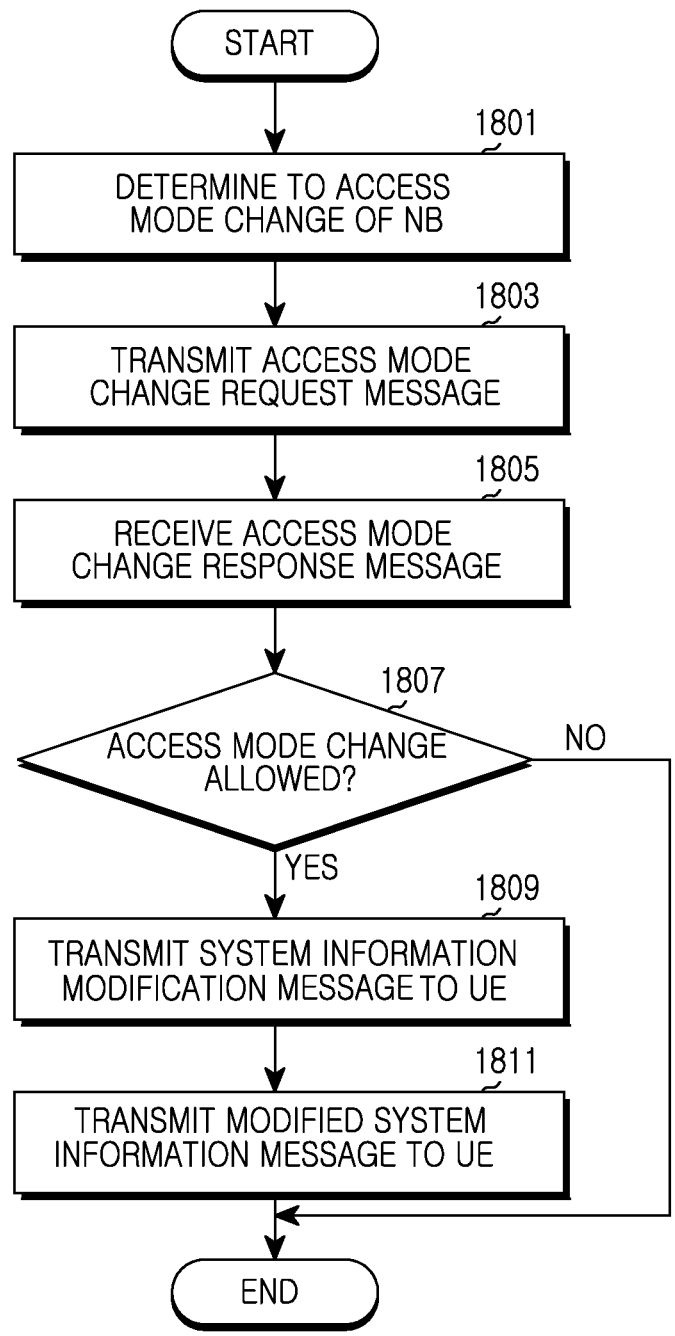
FIG. 18 is a flowchart illustrating an operating method of an NB, for changing an access mode of the NB according to a request from the NB in a wireless communication system according to an embodiment of the present invention.

FIG. 18 is a flowchart illustrating an operating method of an NB, for changing an access mode of the NB according to a request of the NB in a wireless communication system, according to an embodiment of the present invention.

Referring to FIG. 18, the NB determines to change its own access mode in step 1801. When the NB is a femto NB, the NB may additionally receive an allowance from an owner of the femto NB to change the access mode.

In step 1803, the NB transmits an access mode change request message to a CN, requesting to change its access mode, and in step 1805, receives an access mode change response message including an access mode control result from the CN.

The NB determines whether an allowance has been determined with respect to the access mode change of the NB as an access mode control result in step 1807.

When the access mode change of the NB has not been allowed in step 1807, the NB ends the procedure.

However, when the access mode change of the NB has been allowed in step 1807, the NB informs a UE that the access mode has changed, and accordingly, that system information has changed, by transmitting a system information modification message to the UE in step 1809. In step 1811, the NB transmits a system information message including system information of the changed access mode to the UE.

Figure 19:
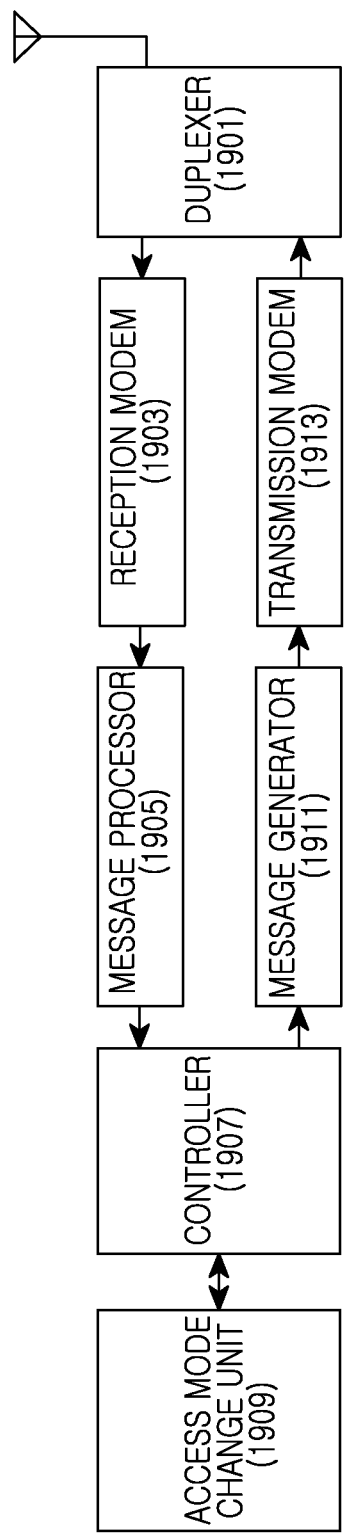
FIG. 19 is a block diagram illustrating an NB according to an embodiment of the present invention.

FIG. 19 is a block diagram illustrating an NB according to an embodiment of the present invention.

Referring to FIG. 19, the NB includes a duplexer 1901, a reception modem 1903, a message processor 1905, a controller 1907, an access mode change unit 1909, a message generator 1911, and a transmission modem 1913.

The duplexer 1901 transmits a transmission signal provided from the transmission modem 1913 via an antenna, and provides a reception signal from the antenna to the reception modem 1903 according to a duplexing scheme.

The reception modem 1903 recovers data from a signal provided from the duplexer 1901, and transfers the data to the message processor 1905. For example, the reception modem 1903 includes a Radio Frequency (RF) reception block, a demodulation block, and a channel-decoding block. The RF reception block includes a filter and an RF pre-processor. When a wireless communication system utilizes OFDM scheme, the demodulation block includes a Fast Fourier Transform (FFT) operator for extracting data contained in each subcarrier. The channel-decoding block includes a demodulator, a deinterleaver, and a channel decoder.

The message processor 1905 extracts control information from a signal provided from the reception modem 1903 and provides the extracted control information to the controller 1907. For example, the message processor 1905 extracts a message related to an access mode change provided from a CN or a neighbor NB, and provides the extracted message to the controller 1907.

The controller 1907 controls an entire transmission/reception operation of the NB. Specifically, the controller 1907 determines to change an access mode of a neighbor NB or the NB for the purpose of reducing an interference or distributing a cell load, controls the message generator 1911 to generate an access mode change request message requesting the access mode change according to the decision, and controls the transmission modem 1913 to transmit the generated message to the CN or the neighbor NB. In addition, when an access mode change request message requesting the NB to change the access mode of the NB is received from the CN or the neighbor NB via the message processor 1905, the controller 1907 controls the access mode of the NB to determine whether to allow the access mode change of the NB, controls the message generator 1911 to generate an access mode change response message including an access mode control result according to the decision, and controls the transmission modem 1913 to transmit the generated message to the CN or the neighbor NB.

When the NB is a femto NB, the controller 1907 may additionally receive an allowance from an owner of the femto NB to change the access mode. In addition, when determining to change the access mode of the NB or performing an access mode control in response to a request of the CN or the neighbor NB to allow the access mode change of the NB, the controller 1907 controls the message generator 1911 to generate a system information modification message informing that the access mode has changed, and accordingly, that system information has changed, and generate a system information message including system information of the changed access mode, and controls the transmission modem 1913 to transmit the generated messages to the UE.

The access mode change unit 1909 changes the access mode of the NB according to the decision of the controller 1907.

The message generator 1911 generates a message to be transmitted to the CN, the neighbor NB, or the UE under control of the controller 1907, and provides the generated message to the transmission modem 1913. For example, the message generator 1911 generates a message related to the access mode change and provides the same to the transmission modem 1913.

The transmission modem 1913 converts a message or transmission data provided from the message generator 1911 into a form for transmission via a radio resource and provides the same to the duplexer 1901. For example, the transmission modem 1913 includes a channel encoding block, a modulation block, and an RF transmission block. The channel encoding block includes a modulator, an interleaver, and a channel encoder. When a wireless communication system utilizes the OFDM scheme, the modulation block includes an Inverse Fast Fourier Transform (IFFT) operator for mapping data to each subcarrier. The RF transmission block includes a filter and an RF pre-processor.

In the above description of FIG. 19, the controller 1907 controls the message processor 1905, the access mode change unit 1909, and the message generator 1911. Alternatively, the controller 1907 may perform the functions of the message processor 1905, the access mode change unit 1909, and the message generator 1911. The separate configuration and illustration of the controller 1907 controls the message processor 1905, the access mode change unit 1909, and the message generator 1911 in FIG. 19 is provided for separately describing each function. Therefore, in actual realization, all or some of the functions of them may be processed by the controller 1907.

As described above, the various embodiments of the present invention solve an interference problem generated between neighbor NBs that use different access modes, while using the same frequency, and provide a load balancing effect in a specific area or when an event occurs by changing an access mode of an NB depending on different factors in a wireless communication system.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method for changing an access mode of a second node B (NB), by a core network (CN), in a wireless communication system, the method comprising:

receiving, from a first NB, a request to change the access mode of the second NB from a first mode into a second mode or from the second mode into the first mode;

determining, by the CN, to change the access mode of the second NB;

transmitting, to the second NB, a request message requesting to change the access mode of the second NB; and receiving, from the second NB, a response message informing of an access mode control result, wherein the first mode allows access only to users or terminals having a registration in the second NB, and the second mode allows access to users or terminals, regardless of the registration in the second NB, wherein, if the access mode of the second NB is changed from the first mode to the second mode, the second NB further grants access to at least one user or terminal not registered in the second NB, and wherein, if the access mode of the second NB is changed from the second mode to the first mode, the second NB controls at least one user or terminal not registered in the second NB to handover to a neighbor NB.

2. A method for changing an access mode by a node B (NB) of a wireless communication system, the method comprising:

receiving, from a core network or another NB, a request message requesting to change the access mode of the NB from a first mode into a second mode or from the second mode into the first mode, wherein the first mode allows access only to users or terminals having a registration in the NB, and the second mode allows access to users or terminals regardless of the registration in the NB;

determining to change the access mode;

transmitting, to the core network or the another NB, a response message informing of an access mode control result;

if the access mode of the NB is changed from the first mode to the second mode, further granting access to at least one user or terminal not registered in the NB; and if the access mode of the NB is changed from the second mode to the first mode, controlling at least one user or terminal not registered in the NB to handover to a neighbor NB.

3. The method of claim 2, further comprising:
transmitting a request to an owner of the NB; and
receiving, from the owner of the NB, a response representing whether to allow an access mode change of the NB.

4. The method of claim 2, further comprising:
transmitting a system information modification message informing that system information is modified according to a change of the access mode; and
transmitting a system information message including information on the changed mode.

5. A method for changing an access mode by a node B (NB) in a wireless communication system, the method comprising:
determining to change the access mode of the NB from a first mode into a second mode or from the second mode into the first mode, wherein the first mode allows access only to users or terminals having a registration in the NB, and the second mode allows access to users or terminals regardless of the registration in the NB;
transmitting, to a core network (CN), a request message requesting to change the access mode of the NB;
receiving, from the CN, a response message informing of an access mode control result to change the access mode;
if the access mode of the NB is changed from the first mode to the second mode, further granting access to at least one user or terminal not registered in the NB; and
if the access mode of the NB is changed from the second mode to the first mode, controlling at least one user or terminal not registered in the NB to handover to a neighbor NB.

6. The method of claim 5, further comprising:
transmitting a request to an owner of the NB; and
receiving, from the owner of the NB, a response indicating whether to allow an access mode change of the NB.

7. The method of claim 5, further comprising:
transmitting a system information modification message informing that system information is modified according to a change of the access mode; and
transmitting a system information message including information on the changed mode.

8. The method of claim 5, wherein determining to change the access mode of the NB comprises:
exchanging load information including respective cell load information with a plurality of NBs;
determining whether coverage areas of the NB and the neighbor NB overlap each other, whether a cell load of the neighbor NB is greater than a reference level, and whether a cell load of the NB is less than the reference level, based on the load information for each cell, and an inter-NB coverage mapping table; and
when determining that the coverage areas of the NB and the neighbor NB overlap each other, the cell load of the neighbor NB is greater than the reference level, and the cell load of the NB is less than the reference level, determining to change the access mode of the NB.

9. A first node B (NB) of a wireless communication system that changes an access mode of a second NB, the first NB comprising:
a controller for determining to change the access mode of the second NB from a first mode into a second mode or from the second mode into the first mode;
a transmitter for transmitting, to the second NB, a request message requesting to change the access mode of the second NB; and
a receiver for receiving, from the second NB, a response message informing of an access mode control result,
wherein the first mode allows access only to users or terminals having a registration in the second NB, and the second mode allows access to users or terminals, regardless of the registration in the second NB,
wherein, if the access mode of the second NB is changed from the first mode to the second mode, the second NB further grants access to at least one user or terminal not registered in the second NB, and
wherein, if the access mode of the second NB is changed from the second mode to the first mode, the second NB controls at least one user or terminal not registered in the second NB to handover to a neighbor NB.

10. The first NB of claim 9, wherein the receiver receives a measurement report message from a terminal, and
wherein the controller determines to change the access mode of the second NB, when it is determined that the terminal receives an interference of more than a reference level from the second NB, based on the measurement report message.

11. The first NB of claim 9, wherein the receiver receives load information including respective cell load information from a plurality of NBs, and
wherein the controller determines to change the access mode of the second NB, when it is determined that coverage areas of the first NB and the second NB overlap each other, a cell load of the first NB is greater than a reference level, and a cell load of the second NB is less than the reference level, based on the load information and an inter-NB coverage mapping table.

12. A node B (NB) of a wireless communication system that changes an access mode of the NB, the NB comprising:
a receiver for receiving, from a core network (CN) or another NB, a request message requesting to change the access mode of the NB from a first mode into a second mode or from the second mode into the first mode, wherein the first mode allows access only to users or terminals having a registration in the NB, and the second mode allows access to users or terminals regardless of the registration in the NB;

a controller for determining whether to change the access mode; and a transmitter for transmitting, to the CN or the another NB, a response message informing of an access mode control result to change the access mode, wherein the controller, if the access mode of the NB is changed from the first mode to the second mode, further grants access to at least one user or terminal not registered in the NB, and wherein the controller, if the access mode of the NB is changed from the second mode to the first mode, controls at least one user or terminal not registered in the NB to handover to a neighbor NB.

13. The NB of claim 12, wherein the transmitter transmits a request to an owner of the NB, and wherein the receiver receives, from the owner of the NB, a response indicating whether to allow an access mode change of the NB.

14. The NB of claim 12, wherein, when the controller determines to allow the access mode change of the NB, the transmitter transmits a system information modification message informing that system information is modified according to a change of the access mode, and transmits a system information message including information on the changed mode.

15. A node B (NB) of a wireless communication system that changes an access mode of the NB, the NB comprising:

a controller for determining to change the access mode of the NB from a first mode into a second mode or from the second mode into the first mode, wherein the first mode allows access only to users or terminals having a registration in the NB, and the second mode allows access to users or terminals regardless of the registration in the NB;

a transmitter for transmitting, to a core network (CN), a request message requesting to change the access mode of the NB; and a receiver for receiving, from the CN, a response message informing of an access mode control result to change the access mode, wherein the controller, if the access mode of the NB is changed from the first mode to the second mode, further grants access to at least one user or terminal not registered in the NB, and wherein the controller, if the access mode of the NB is changed from the second mode to the first mode, controls at least one user or terminal not registered in the NB to handover to a neighbor NB.

16. The NB of claim 15, wherein the transmitter transmits a request message to an owner of the NB, and wherein the receiver receives, from the owner of the NB, a response message representing whether to allow the access mode change of the NB.

17. The NB of claim 15, wherein the transmitter transmits a system information modification message informing that system information is modified according to a change of the access mode, and transmits a system information message including information on the changed mode.

18. The NB of claim 15, wherein the receiver receives load information including respective cell load information from a plurality of NBs, and wherein the controller determines to change the access mode of the NB, when it is determined that coverage areas of the NB and a neighbor NB overlap each other, a cell load of the neighbor NB is greater than a reference level, and a cell load of the NB is less than a reference level, based on the load information for each cell and an inter-NB coverage mapping table.

19. A method for changing an access mode of a second node B (NB), by a first NB, of a wireless communication system, the method comprising:

determining to change the access mode of the second NB from a first mode into a second mode or from the second mode into the first mode;

transmitting, to a core network (CN), a request message requesting to change the access mode of the second NB; and receiving, from the CN, a response message informing of an access mode control result to change the access mode, wherein the first mode allows access only to users or terminals having a registration in the second NB, and the second mode allows access to users or terminals, regardless of the registration in the second NB, wherein, if the access mode of the second NB is changed from the first mode to the second mode, the second NB further grants access to at least one user or terminal not registered in the second NB, and wherein, if the access mode of the second NB is changed from the second mode to the first mode, the second NB controls at least one user or terminal not registered in the second NB to handover to a neighbor NB.

20. The method of claim 19, wherein determining to change the access mode of the second NB comprises:

receiving a measurement report message from a terminal;

determining whether the terminal receives an interference of more than a reference level from the second NB, based on the measurement report message; and when it is determined that the terminal receives the interference of more than the reference level from the second NB, determining to change of the access mode of the second NB.

21. The method of claim 19, further comprising:

exchanging load information including respective cell load information with a plurality of NBs;

determining whether coverage areas of the first NB and the second NB overlap each other, a cell load of the first NB is greater than a reference level, and a cell load of the second NB is less than the reference level, based on load information for each cell and an inter-NB coverage mapping table; and when the coverage areas of the first NB and the second NB overlap each other, the cell load of the first NB is greater than the reference level, and the cell load of the second NB is less than the reference level, determining to change the access mode of the second NB.

22. A method for changing an access mode of a second node B (NB), by a core network (CN), of a wireless communication system, the method comprising:

determining to change the access mode of the second NB from a first mode into a second mode or from the second mode into the first mode;

transmitting, to the second NB, a request message requesting to change the access mode of the second NB; and receiving, from the second NB, a response message informing of an access mode control result to change the access mode, wherein the first mode allows access only to users or terminals having a registration in the second NB, and the second mode allows access to users or terminals, regardless of the registration in the second NB, wherein, if the access mode of the second NB is changed from the first mode to the second mode, the second NB further grants access to at least one user or terminal not registered in the second NB, and wherein, if the access mode of the second NB is changed from the second mode to the first mode, the second NB controls at least one user or terminal not registered in the second NB to handover to a neighbor NB.

23. The method of claim 22, wherein determining to change the access mode of the second NB comprises:
receiving load information including respective cell load information from a plurality of NBs;
determining whether a first NB having a coverage that overlaps a coverage area of the second NB and having a cell load that is greater than a reference level exists, and a cell load of the second NB is less than the reference level, based on load information for each cell and an inter-NB coverage mapping table; and
when it is determined that the first NB having the coverage that overlaps the coverage area of the second NB and having the cell load that is greater than the reference level exists, and that the cell load of the second NB is less than the reference level, determining to change the access mode of the second NB.

24. A first node B (NB) of a wireless communication system, the first NB comprising:
a controller for determining to change an access mode of a second NB from a first mode into a second mode or from the second mode into the first mode;
a transmitter for transmitting, to core network (CN), a request message requesting to change the access mode of the second NB; and
a receiver for receiving, from the CN, a response message informing of an access mode control result to change the access mode,
wherein the first mode allows access only to users or terminals having a registration in the second NB, and the second mode allows access to users or terminals, regardless of the registration in the second NB,
wherein, if the access mode of the second NB is changed from the first mode to the second mode, the second NB further grants access to at least one user or terminal not registered in the second NB, and
wherein, if the access mode of the second NB is changed from the second mode to the first mode, the second NB controls at least one user or terminal not registered in the second NB to handover to a neighbor NB.

25. The first NB of claim 24, wherein the receiver receives a measurement report message from a terminal, and
wherein the controller determines to change the access mode of the second NB, when it is determined that the terminal receives an interference of more than a reference level from the second NB, based on the measurement report message.

26. The first NB of claim 24, wherein the receiver receives load information including respective cell load information from a plurality of NBs, and wherein the controller determines to change the access mode of the second NB, when it is determined that the coverage areas of the first NB and the second NB overlap each other, a cell load of the first NB is greater than a reference level, and a cell load of the second NB is less than the reference level, based on the load information for each cell and an inter-NB coverage mapping table.

27. A method for changing an access mode of a second node B (NB), by a first node NB, of a wireless communication system, the method comprising:
determining to change the access mode of the second NB from a first mode into a second mode or from the second mode into the first mode;
transmitting, to the second NB, a request message requesting to change the access mode of the second NB; and
receiving, from the second NB, a response message informing of an access mode control result to change the access mode,
wherein the first mode allows access only to users or terminals having a registration in the second NB, and the second mode allows access to users or terminals, regardless of the registration in the second NB,
wherein, if the access mode of the second NB is changed from the first mode to the second mode, the second NB further grants access to at least one user or terminal not registered in the second NB, and
wherein, if the access mode of the second NB is changed from the second mode to the first mode, the second NB controls at least one user or terminal not registered in the second NB to handover to a neighbor NB.

28. The method of claim 27, wherein determining to change the access mode of the second NB comprises:
receiving a measurement report message from a terminal;
determining whether the terminal receives an interference of more than a reference level from the second NB, based on the measurement report message; and
when determining that the terminal receives the interference of more than the reference level from the second NB, determining to change of the access mode of the second NB.

29. The method of claim 27, wherein determining to change the access mode of the second NB comprises:
exchanging load information including respective cell load information with a plurality of NBs;
determining whether coverage areas of the first NB and the second NB overlap each other, a cell load of the first NB is greater than a reference level, and a cell load of the second NB is less than the reference level, based on load information for each cell and an inter-NB coverage mapping table; and
when the coverage areas of the first NB and the second NB overlap each other, the cell load of the first NB is greater than the reference level, and the cell load of the second NB is less than the reference level, determining to change the access mode of the second NB.

* * * * *